US010325040B2

(12) United States Patent
Drasny et al.

(10) Patent No.: US 10,325,040 B2
(45) Date of Patent: *Jun. 18, 2019

(54) CONDITIONAL PHASE ALGEBRA FOR CLOCK ANALYSIS

(71) Applicant: International Business Machines Corporation, Armonk, NY (US)

(72) Inventors: Gabor Drasny, Poughkeepsie, NY (US); Gavin B. Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/547,953

(22) Filed: Nov. 19, 2014

(65) Prior Publication Data

US 2015/0161311 A1 Jun. 11, 2015

Related U.S. Application Data

(60) Provisional application No. 61/912,345, filed on Dec. 5, 2013.

(51) Int. Cl.
*G06F 17/50* (2006.01)
*G06F 8/41* (2018.01)

(52) U.S. Cl.
CPC ...... *G06F 17/5022* (2013.01); *G06F 17/5031* (2013.01); *G06F 17/5045* (2013.01);
(Continued)

(58) Field of Classification Search
CPC ............ G06F 17/5031; G06F 17/5045; G06F 17/5059; G06F 2217/06; G06F 2217/62; G06F 2217/84
(Continued)

(56) References Cited

U.S. PATENT DOCUMENTS 5,210,700 A 5/1993 Tom
5,452,239 A 9/1995 Dai et al.
(Continued)

FOREIGN PATENT DOCUMENTS

WO 002080046 10/2002

OTHER PUBLICATIONS

Singh, et al., "Generalized Latency-Insensitive Systems for Single-Clock and Multi-Clock Architectures", Design, Automation and Test in Europe Conference and Exhibition, 2004. Proceedings (vol. 2 ), Feb. 2004, pp. 1008-1013.
(Continued)

*Primary Examiner* — Vuthe Siek
(74) *Attorney, Agent, or Firm* — DeLizio Law, PLLC

(57) ABSTRACT

A design tool can implement phase algebra based design evaluation to evaluate a circuit design with a compact representation of numerous waveforms without simulating the individual waveforms. The design tool can determine two or more input sequences of signal transition representations associated with an input net of an indicated component in an RTL circuit design, where the two or more input sequences of signal transition representations are associated with a mode element. Each signal transition representation represents a nondeterministic transition from a previous signal state to possible signal state(s). The mode element indicates a selection between two or more output sequences of signal transition representations. It is determined, based on the indicated component and the mode element, two or more output sequences of signal transition representations derived from the input sequence(s) of signal transition representations.

12 Claims, 16 Drawing Sheets

(52) U.S. Cl.
CPC .......... *G06F 17/5059* (2013.01); *G06F 8/427* (2013.01); *G06F 8/443* (2013.01); *G06F 2217/06* (2013.01); *G06F 2217/62* (2013.01); *G06F 2217/84* (2013.01)

(58) Field of Classification Search
USPC ........................................ 716/102, 106, 107
See application file for complete search history.

(56) References Cited

U.S. PATENT DOCUMENTS

| | | |
|---|---|---|
| 5,835,380 A | 11/1998 | Roethig |
| 5,862,149 A | 1/1999 | Carpenter et al. |
| 6,175,946 B1 | 1/2001 | Ly et al. |
| 6,377,094 B1 | 4/2002 | Carley |
| 6,952,825 B1 | 10/2005 | Cockx et al. |
| 7,073,146 B2 | 7/2006 | Sarwary et al. |
| 7,080,365 B2 | 7/2006 | Broughton et al. |
| 7,089,518 B2 | 8/2006 | Bar et al. |
| 7,106,115 B2 | 9/2006 | Carley et al. |
| 7,107,557 B2 | 9/2006 | Iwanishi |
| 7,124,342 B2 | 10/2006 | Wang et al. |
| 7,139,988 B2 | 11/2006 | Chard et al. |
| 7,243,322 B1 | 7/2007 | Ly et al. |
| 7,251,794 B2 | 7/2007 | Blanco et al. |
| 7,283,944 B2 | 10/2007 | Tsai et al. |
| 7,299,436 B2 | 11/2007 | Chu et al. |
| 7,333,926 B2 | 2/2008 | Schuppe |
| 7,356,789 B2 | 4/2008 | Ly et al. |
| 7,454,728 B2 | 11/2008 | Ly et al. |
| 7,478,346 B2 | 1/2009 | Hsu et al. |
| 7,484,192 B2 | 1/2009 | Ja et al. |
| 7,484,196 B2 | 1/2009 | Ja et al. |
| 7,562,244 B2 | 7/2009 | Wielage |
| 7,594,200 B2 | 9/2009 | Eisner et al. |
| 7,627,844 B2 | 12/2009 | Rahmat et al. |
| 7,877,717 B2 | 1/2011 | Chu et al. |
| 7,882,473 B2 | 2/2011 | Baumgartner et al. |
| 7,979,820 B1 | 7/2011 | Patzer et al. |
| 7,996,827 B2 | 8/2011 | Vorbach et al. |
| 8,069,024 B1 | 11/2011 | Croix |
| 8,271,918 B2 | 9/2012 | Kwok et al. |
| 8,352,235 B1 | 1/2013 | Lin et al. |
| 8,407,636 B2 | 3/2013 | Iwashita |
| 8,434,047 B1 | 4/2013 | Jiang et al. |
| 8,438,516 B2 | 5/2013 | Ly et al. |
| 8,438,517 B2 | 5/2013 | Appleton et al. |
| 8,448,111 B2 | 5/2013 | Mneimneh et al. |
| 8,533,541 B2 | 9/2013 | Iwashita |
| 8,914,761 B2 | 12/2014 | Ly et al. |
| 8,935,642 B1 | 1/2015 | Bhardwaj et al. |
| 8,977,995 B1 | 3/2015 | Arora et al. |
| 9,026,978 B1 | 5/2015 | Liu et al. |
| 9,223,916 B2 | 12/2015 | Dilullo et al. |
| 9,251,304 B2 | 2/2016 | Drasny et al. |
| 2002/0152060 A1 | 10/2002 | Tseng |
| 2003/0192018 A1* | 10/2003 | Baumgartner ...... G06F 17/5022 716/108 |
| 2004/0060024 A1 | 3/2004 | Bednar et al. |
| 2004/0078767 A1 | 4/2004 | Burks et al. |
| 2005/0268269 A1 | 12/2005 | Coiley |
| 2006/0022729 A1 | 2/2006 | Carley et al. |
| 2007/0168893 A1 | 7/2007 | Watanabe et al. |
| 2007/0174805 A1 | 7/2007 | Hsu et al. |
| 2008/0072188 A1 | 3/2008 | Ja et al. |
| 2009/0055668 A1 | 2/2009 | Fernsler et al. |
| 2009/0106183 A1* | 4/2009 | Estan ...................... H04L 69/22 706/48 |
| 2009/0112555 A1 | 4/2009 | Boerstler et al. |
| 2009/0271167 A1 | 10/2009 | Zhu et al. |
| 2010/0031209 A1 | 2/2010 | Luan et al. |
| 2010/0199244 A1 | 8/2010 | Kwok et al. |
| 2010/0235799 A1 | 9/2010 | Rice et al. |
| 2011/0113392 A1 | 5/2011 | Subhra et al. |
| 2011/0133806 A1 | 6/2011 | Subramani et al. |
| 2011/0197172 A1 | 8/2011 | Yamamoto et al. |
| 2011/0291769 A1 | 12/2011 | Burstein et al. |
| 2013/0132760 A1 | 5/2013 | Talupuru et al. |
| 2013/0246985 A1 | 9/2013 | Ly et al. |
| 2013/0343441 A1 | 12/2013 | Alfieri |
| 2015/0026654 A1 | 1/2015 | Kwok et al. |
| 2015/0058818 A1 | 2/2015 | Srinivasan et al. |
| 2015/0161309 A1 | 6/2015 | Drasny et al. |
| 2015/0161310 A1 | 6/2015 | Drasny et al. |
| 2015/0161312 A1 | 6/2015 | Drasny et al. |
| 2015/0161313 A1 | 6/2015 | Dransy et al. |
| 2015/0161315 A1 | 6/2015 | Meil |
| 2015/0169816 A1 | 6/2015 | Drasny et al. |
| 2015/0269296 A1 | 9/2015 | Drasny et al. |
| 2015/0269299 A1 | 9/2015 | Drasny et al. |
| 2015/0370939 A1 | 12/2015 | Drasny et al. |
| 2015/0370940 A1 | 12/2015 | Drasny et al. |
| 2016/0078162 A1 | 3/2016 | Drasny et al. |
| 2016/0188760 A1 | 6/2016 | Drasny et al. |
| 2016/0188785 A1 | 6/2016 | Drasny et al. |

OTHER PUBLICATIONS

Suhaib, "Formal Methods for Intellectual Property Composition Across Synchronization Domains", Dissertation submitted to the Faculty of the Virginia Polytechnic Institute and State University, Aug. 29, 2007, 190 pages.

Chakrabarty, et al., "Synthesis of Transparent Circuits for Hierarchical and System-On-A Chip Test", National Science Foundation under grant No. CCR-9875324. pp. 1-6., 2001, 6 pages.

Foulon, "Cad Flow for System on Chip", The 13th International Conference on Microelectronics Rabat, Morocco, pp. 241-244, Oct. 29-31, 2001, Oct. 2001, 4 pages.

Hari, et al., "Automatic Constraint Based Test Generation for Behavioral HDL Models", IEEE Transactions on Very Large Scale Integration (VLSI) Systems, vol. 16, No. 4, pp. 408-421, Apr. 2008, Apr. 2008, 14 pages.

Ravi, et al., "TAO: Regular Expression-Based Register-Transfer Level Testability Analysis and Optimization", IEEE Transactions on Very Large Scale Integration (VLSI) Systems, vol. 9, No. 6, pp. 824-832, Dec. 2001, Dec. 2001, 9 pages.

Seshadri, et al., "An Integrated Approach to Behavioral-Level Design-For-Testability Using Value-Range and Variable Testability Techniques", International Test Conference, 1999. pp. 858-867., 1999, 10 pages.

Srinivas, et al., "Formal Verification of Digital Circuits Using Hybrid Simulation", IEEE Circuits and Devices Magazine, pp. 19-27, Jan. 1988., Jan. 1988, 9 pages.

"U.S. Appl. No. 14/274,956 Ex Parte Quayle Action", filed Apr. 10, 2015, 6 pages.

"U.S. Appl. No. 14/327,658 Office Action", dated Apr. 3, 2015, 9 pages.

Cummings, "Clock Domain Crossing (CDC) Design & Verification Techniques Using SystemVerilog", SNUG-2008, 2008, 56 pages.

Litterick, "Pragmatic Simulation-Based Verification of Clock Domain Crossing Signals and Jitter using SystemVerilog Assertions", Verilab & DVCon ; https://www.verilab.com/files/sva_cdc_presentation_dvcon2006.pdf, 2006, 6 pages.

Narain, et al., "Clock Domain Crossing Demystified: The Second Generation Solution for CDC Verification", (Real Intent and Sunburst Design white paper), Mar. 13, 2008., 2008, 20 pages.

Schubert, et al., "Solutions to IBM POWER8 Verification Challenges", IBM J. Res. & Dev., vol. 59, No. 1, Paper 11, Jan. 2015, pp. 11:1-11:17.

Czeck, et al., "Reliable Design with Multiple Clock Domains", Conference: Formal Methods and Models for Co-Design, 2006. MEMOCODE '06. Proceedings. Fourth ACM and IEEE International Conference on Source: IEEE Xplore, 2006, 10 pages.

"U.S. Appl. No. 14/547,532 FAIIP PreInterview Communication", filed Mar. 22, 2016, 7 Pages.

"U.S. Appl. No. 14/547,820 FAIIP—OA Summary", dated May 10, 2016, 10 pages.

"U.S. Appl. No. 14/560,599 FAIIP PreInterview Communication", dated Apr. 13, 2016, 3 pages.

(56) References Cited

OTHER PUBLICATIONS

"U.S. Appl. No. 14/631,539 FAIIP PreInterview Communication", dated May 31, 2016, 24 pages.
"U.S. Appl. No. 11/547,532 FAI—OfficeAction Summary", dated Jun. 9, 2016, 9 pages.
"U.S. Appl. No. 14/840,517 FAIIP PreInterview Communication", dated Jul. 14, 2016, 5 pages.
"U.S. Appl. No. 14/734,912 FAIIP PreInterview Communication", dated Aug. 29, 2016, 5 pages.
"U.S. Appl. No. 14/840,372 FAI OA Summary", dated Feb. 15, 2017, 9 pages.
"U.S. Appl. No. 14/840,517 Office Action", dated Jan. 18, 2017, 12 pages.
"U.S. Appl. No. 14/547,532 Final Office Action", dated Oct. 26, 2016, 11 pages.
"U.S. Appl. No. 14/547,820 Final Office Action", dated Nov. 23, 2016, 9 pages.
"U.S. Appl. No. 14/631,539 FAI—OfficeAction Summary", Nov. 22, 2016, 7 pages.
"U.S. Appl. No. 141/34,912 FAI—OfficeAction Summary", dated Nov. 10, 2016, 11 pages.
"U.S. Appl. No. 14/840,372 FAIIP PreInterview Communication", dated Oct. 20, 2016, 3 pages.
"U.S. Appl. No. 14/840,774 FAI PreInterview Comm.", dated Oct. 18, 2016, 5 pages.
"U.S. Appl. No. 14/547,820 Final Office Action", dated Oct. 10, 2017, 9 pages.
"U.S. Appl. No. 14/840,517 Office Action", dated Oct. 10, 2017, 10 pages.
"U.S. Appl. No. 14/840,517 Final Office Action", dated Jun. 9, 2017, 9 pages.
"U.S. Appl. No. 15/061,532 First Action Interview—Pre Interview", dated Jul. 14, 2017, 5 pages.
"U.S. Appl. No. 15/061,601 First Action Interview—Pre Interview", dated Jul. 17, 2017, 5 pages.
"U.S. Appl. No. 14/547,820 Office Action", dated Apr. 26, 2017, 8 pages.
"U.S. Appl. No. 14/631,539 Final Office Action", dated Jun. 1, 2017, 9 pages.
"U.S. Appl. No. 14/734,912 Final Office Action", dated Mar. 24, 2017, 14 pages.
"U.S. Appl. No. 14/840,372 Final Office Action", dated May 18, 2017, 15 pages.
"U.S. Appl. No. 14/840,774 Office Action", dated Apr. 18, 2017, 7 pages.
"U.S. Appl. No. 14/840,372 Office Action", dated Dec. 20, 2017, 8 pages.
"U.S. Appl. No. 14/840,774 Final Office Action", dated Nov. 6, 2017, 7 pages.
"U.S. Appl. No. 15/061,532 FAI Office Action Summary", dated Nov. 6, 2017, 10 pages.
"U.S. Appl. No. 15/061,601 FAI Office Action Summary", dated Nov. 6, 2017, 10 pages.

\* cited by examiner

CONDITIONAL PHASE ALGEBRA FOR CLOCK ANALYSIS

RELATED APPLICATIONS

This application claims priority from a U.S. Provisional Patent Application Ser. No. 61/912,345, filed on Dec. 5, 2013, entitled "DETECTION OF CLOCK DOMAIN CROSSINGS AND POTENTIAL DEFECTS IN A CIRCUIT DESIGN AT THE REGISTER TRANSFER LEVEL," which is incorporated herein by reference. This application is also related to a U.S. patent application Ser. No. 14/327,658, filed on Jul. 10, 2014, entitled "CIRCUIT DESIGN EVALUATION WITH COMPACT MULTI-WAVEFORM REPRESENTATIONS," which is incorporated herein by reference.

BACKGROUND

Embodiments of the inventive subject matter generally relate to the field of circuit design, and, more particularly, to electronic design automation (EDA) tools to identify potential defects in a register transfer level (RTL) design of a chip or a system on a chip.

EDA tools are used to evaluate chip designs prior to fabrication. The EDA process broadly consists of two steps. The first step is a check of the RTL design logic. The second step is a creation of a physical circuit design from the RTL design. The first step, checking the design logic, can be referred to as RTL design checking. In RTL design checking, a language such as VHDL (Very High Speed Integrated Circuit Hardware Descriptive Language) or Verilog can be used to describe and model the functional behavior of a circuit. RTL design checking itself can be decomposed into two steps. The first step is static checking and the second step is verification, also commonly referred to as a dynamic checking. In static checking, the structure of the design is analyzed without simulating the behavior of the design. Conversely, in verification, the design is simulated by applying test patterns or stimulus to the inputs of the design in an attempt to exhaustively identify possible errors. Verification can be an expensive process for a complex chip or system on a chip. Verification can also be inconclusive, since it is often infeasible to apply all possible test patterns to the inputs of a complex design.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having common frequency and a fixed phase relationship. A clock signal causes a change in the state of sequential logic, such as a flip-flop or transparent latch.

SUMMARY

Embodiments of the inventive subject matter include determining two or more input sequences of signal transition representations associated with an input net of an indicated component in a register transfer level circuit design, where the two or more input sequences of signal transition representations may be associated with a mode element. Each signal transition representation represents a nondeterministic transition from a previous signal state to a set of one or more possible signal states. The mode element indicates a selection between two or more output sequences of signal transition representations. It is determined, based on the indicated component and the mode element, two or more output sequences of signal transition representations derived from the input sequence(s) of signal transition representations.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present disclosure. However, it is understood that the described embodiments may be practiced without these specific details. For instance, the syntax employed to implement the disclosure can be varied. Additionally, although illustrations refer to a flip-flop as a fundamental circuit component, embodiments need not include a flip-flop. For example, a circuit model can include transparent latches and an inverter instead of a flip-flop as fundamental circuit components. Additionally, embodiments may implement fewer operations than the operations described herein, while other embodiments might be implemented with more operations that the ones described herein. In other instances, well-known instruction instances, protocols, structures and techniques have not been shown in detail in order not to obfuscate the description.

Modern processors or systems on a chip include multiple components. Identifying as many design defects as possible at the static checking phase of an RTL design check increases the efficiency of the verification process, thereby saving time and money. A design tool can implement phase algebra based design evaluation as described herein to efficiently evaluate a circuit design with a compact representation of numerous waveforms without simulating the individual waveforms. Instead of individual waveforms, the phase algebra based design evaluation employs compact representations of a group or set of waveforms. Phase algebra based evaluation constructs representations of a set of waveforms based on relationships among a devised set of functions that account for the various states of a signal over time, including representations based on conditional elements.

Figure 1:
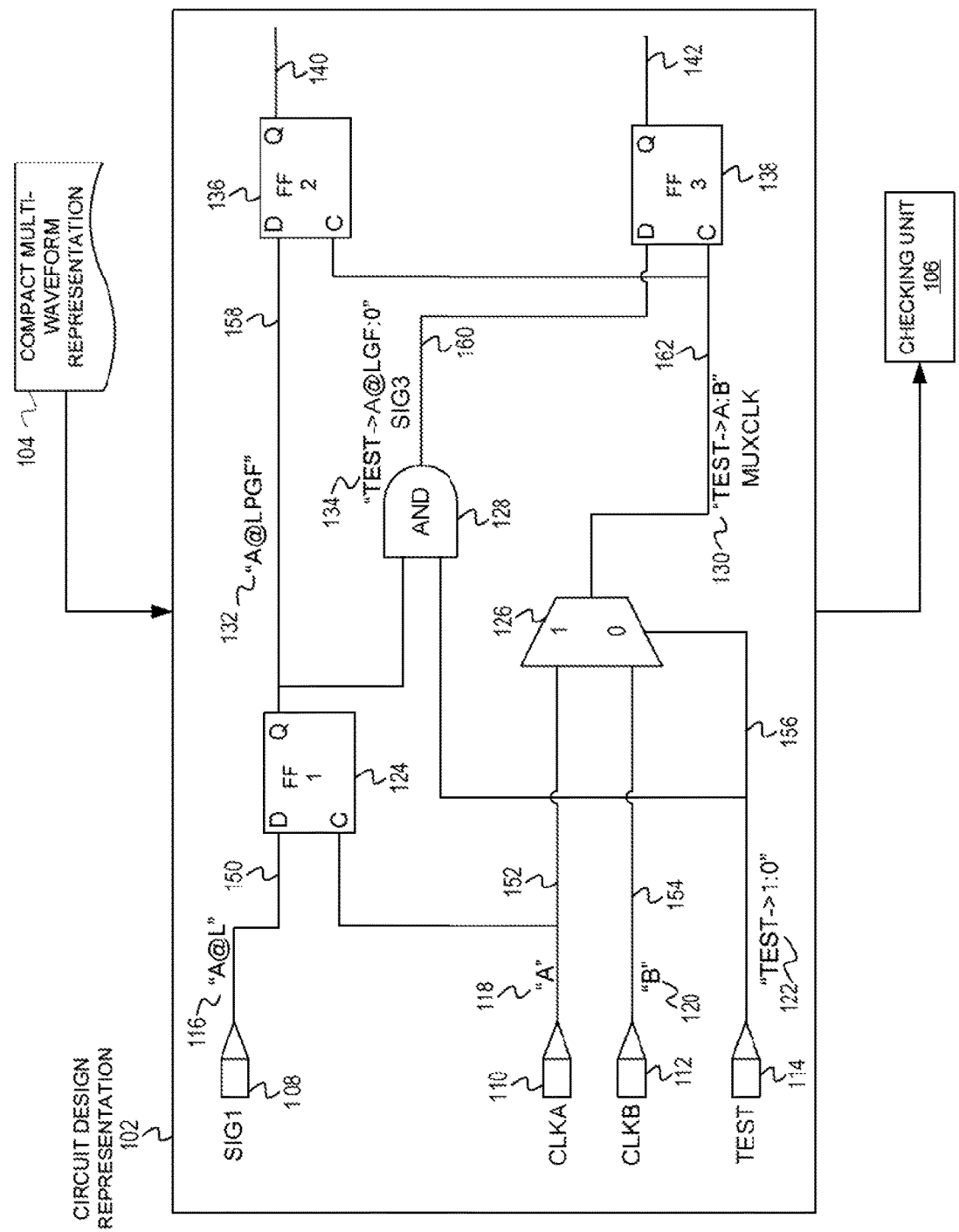
FIG. 1 is a conceptual diagram that depicts example phase algebra based circuit design evaluation with a compact multi-waveform representation.

FIG. 1 is a conceptual diagram that depicts example phase algebra based circuit design evaluation with a compact multi-waveform representation. A circuit design tool performs phase algebra based circuit design evaluation on a machine readable representation 102 of an RTL circuit design. The circuit design representation 102 at least includes primary inputs 108, 110, 112, and 114. A primary input is an input to the circuit itself. A primary input is not driven by any component within the circuit. The primary input 108 represents a data signal that is provided to the circuit. Each of the primary inputs 110 and 112 represents a clock signal that is provided to the circuit. The primary input 114 represents a selector signal that is provided to the circuit.

FIG. 1 depicts the primary inputs 108, 110, 112, and 114 representative of the primary inputs throughout the circuit design representation 102 for ease of understanding. Various example RTL circuit design components that can be modeled in an RTL circuit design are described in the U.S. Patent Application Ser. No. 61/912,345, entitled "DETECTION OF CLOCK DOMAIN CROSSINGS AND POTENTIAL DEFECTS IN A CIRCUIT DESIGN AT THE REGISTER TRANSFER LEVEL."

A compact multi-waveform representation 104 is provided for the circuit design representation 102. For example, the multi-waveform representation 104 is provided in a RTL description using attributes or in a file supplied as input to the circuit design tool. The circuit design tool determines compact multi-waveform representations generated on nets throughout the RTL circuit design dependent upon the components traversed by the compact multi-waveform representations. Example notations "A" 118 and "A@L" 116 for compact multi-waveform representations are depicted. These notations are referred to as "phase tags" herein. This example uses a phase tag to illustrate handling of virtual clocks identified as "A" and "B".

In this description, a phase tag and a phase type are distinguished. A phase type is a construct (e.g., variable or notation) that represents a generic virtual clock. Use of a phase type would be sufficient in a design that contemplates a single virtual clock. A phase tag is a construct that identifies a virtual clock. Although a phase tag can be used in a design that contemplates a single virtual clock, the utility of the phase tag becomes apparent when multiple virtual clocks are being considered, such as a virtual clock "A" and a virtual clock "B". In addition, operators associated with phase tags ("phase tag operators") manipulate results of phase type operators as appropriate for multiple virtual clocks. The particular terminology used to distinguish these constructs should not be used to limit claim scope. For this illustration, the notation "A" represents a set of signals or waveforms with a clock signal behavior corresponding to a virtual clock A. The notation "A@L" represents a set of signals or waveforms corresponding to a latch clocked by the leading edge of the virtual clock identified as A. Similarly, the notation "B" represents a set of signals or waveforms with a clock signal behavior corresponding to a virtual clock B.

The circuit design representation 102 also includes flip-flops 124, 136, and 138, a multiplexer 126, and an AND gate 128. A net 150 is graphically depicted as connecting output of the primary input 108 to a D input of the flip-flop 124. A net 152 is graphically depicted as connecting output of the primary input 110 to a C input of the flip-flop 124 and to a first input of the multiplexer 126. A net 154 is graphically depicted as connecting output of the primary input 112 to a second input of the multiplexer 126. A net 156 is graphically depicted as connecting output of the selector primary input 114 to a selection input of the multiplexer 126 and to the AND gate 128. A net 158 is graphically depicted as connecting output of the flip-flop 124 to a D input of the flip-flop 136 and to an input of the AND gate 128. A net 160 is graphically depicted as connecting output of the AND gate 128 to a D input of the flip-flop 138. A net 162 is graphically depicted as connecting output of the multiplexer 126 to a C input of the flip-flop 138 and to a C input of the flip-flop 136.

The phase algebra based evaluation tool determines that inputting the compact multi-waveform representations denoted by the notations "A@L" 116 and "A" 118 into the flip-flop 124 will yield a compact multi-waveform representation with a notation "A@LPGF" 132, which represents a set of signals or waveforms with a latched leading phase glitch-free behavior. Depending on the implementation, clock gating algebra and/or glitch awareness algebra can be employed by the phase algebra based evaluation tool, as described in the U.S. Patent Application Ser. No. 61/912, 345, entitled "DETECTION OF CLOCK DOMAIN CROSSINGS AND POTENTIAL DEFECTS IN A CIRCUIT DESIGN AT THE REGISTER TRANSFER LEVEL." The phase algebra based evaluation tool propagates compact multi-waveform representations throughout nets of the circuit design representation 102 using look up tables constructed based, at least in part, on a set of possible waveform states, as described in the U.S. Patent Application Ser. No. 61/912,345.

Regarding FIG. 1, the circuit design representation 102 also includes a mode. As further explained below with reference to FIG. 2, a mode is a Boolean function of the value of a signal in a circuit, referred to as a mode signal. A mode signal can be used to select between a first signal and a second signal, where the second signal is different from the first signal. The multiplexer 126 implements a selector of signals of the circuit design representation 102. The multiplexer 126 can receive three signals, CLKA 152, CLKB 154, and TEST 156. The signal TEST 156 is a mode signal. If the signal TEST 156 is a "1", then the multiplexer 126 selects CLKA 152, which becomes the output signal MUXCLK 162; else, the multiplexer 126 selects CLKB 154, which becomes the output signal MUXCLK 162. The signals CLKA 152, CLKB 154, and TEST 156 are associated with three compact multi-waveform representations, respectively: a phase tag of "A" 118, a phase tag of "B" 120, and a phase expression of "TEST->1:0" 122. The phase expression 122 includes a mode expression, "TEST," which represents the mode associated with mode signal TEST 156. In one embodiment, the mode expression "TEST" represents a Boolean function that evaluates to the value true when the mode signal TEST 156 is a "1" and evaluates to the value false when the mode signal TEST 156 is a "0".

A mode of the circuit design representation 102 is depicted by the phase expression "TEST->1:0" 122, which is associated with the selector input 114 and mode signal TEST 156. The phase expression "TEST->1:0" 122 indicates that the phase expression 122 can be either a "1" or a "0" depending on the value of the Boolean function represented by the mode expression "TEST." For example, the phase expression "TEST->1:0" 122 can indicate that the phase expression 122 can be a "1" if the Boolean function represented by the mode expression "TEST" evaluates to the value true, and can be a "0" if the Boolean function represented by the mode expression "TEST" evaluates to the value false. Other interpretations are possible. A mode of the circuit design representation 102 is further depicted by the phase expression "TEST->A:B" 130. The phase expression "TEST->A:B" 130, associated with signal MUXCLK, is determined with respect to the function of the multiplexer 126. The phase expression "TEST->A:B" 130 indicates that the phase expression 130 can be either an "A" or a "B" depending on the value of the Boolean function represented by the mode expression "TEST." The phase expression 130 can be expressed using two (mode, MIPE) pairs, where MIPEs (mode independent phase expressions) are described below. The two pairs for phase expression 130 are ("TEST", "A") and (not "TEST", "B"). A mode of the circuit design representation 102 is further depicted by the phase expression "TEST->A@LGF:0" 134. The phase expression "TEST->A@LGF:0" 134, associated with signal SIG3, is determined with respect to the function of the AND gate 128. The phase expression "TEST->A@LGF:0" 134 indicates that the phase expression 134 can be either an "A@LGF" or a "0" depending on the value of the Boolean function represented by the mode expression "TEST."

The phase algebra based evaluation tool propagates the phase tags 116, 118, and 120, and phase expression 122 through the elements 124, 128, and 126 of the circuit design representation 102 to generate the phase expressions 130, 132, and 134. Similarly, the phase algebra based evaluation tool propagates the phase expressions 130, 132, and 134 through the elements 136 and 138 of the circuit design representation 102 to generate the phase expressions associated with signals 140 and 142. The phase expression associated with signal 140 is "TEST->A@LPGF: B@LPGF", and the phase expression associated with signal 142 is "TEST->A@LPGF:0". The manner in which the phase tags and phase expressions are propagated through the circuit design representation 102 is described in more detail below.

When compact multi-waveform representations have been determined, a checking unit 106 of the evaluation tool analyzes the compact multi-waveform representations associated with the nets of the circuit design representation 102. The checking unit 106 can identify defects in the design using these compact multi-waveform representations. For example, the checking unit 106 will evaluate the transition behavior represented by a compact multi-waveform representation associated with a net against a rule or constraint of the net. The rule or constraint of the net can be explicit (e.g., directly defined in associated with the net) or implicit (e.g., indirectly associated with the net via a characteristic of the net or at least one of the sinks of the net). For example, the phase expression outputs generated in FIG. 1 (e.g., outputs 130, 132, and 134) can be provided to the checking algorithms (such as described with reference to FIGS. 10-15) to detect characteristics associated with the design.

Figure 2:
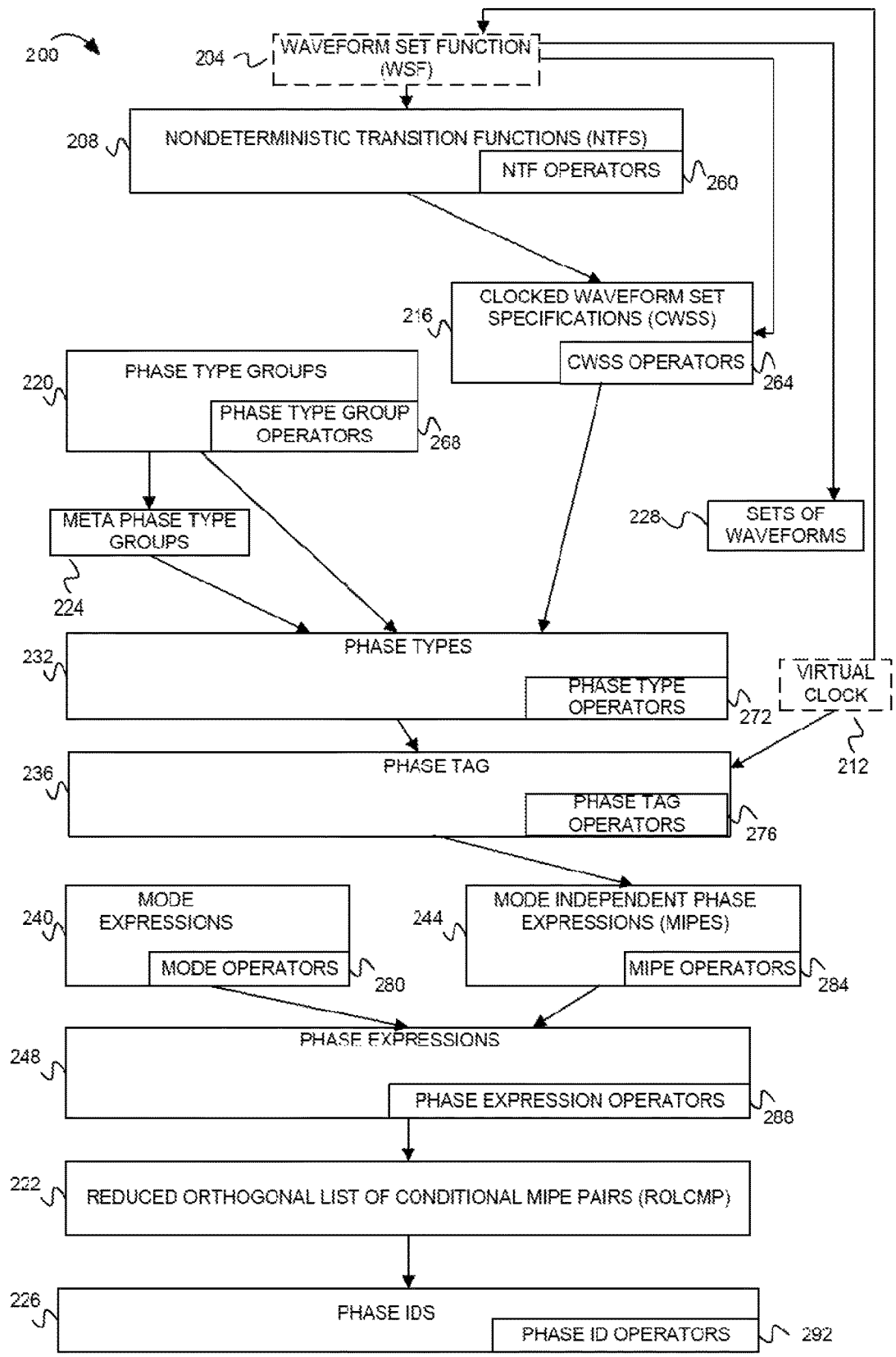
FIG. 2 is a conceptual diagram that depicts an example hierarchy of relationships among data constructs.

A previous state of a signal can be related to multiple possible next states of the signal with a compact representation. Each of these relationships is referred to herein as a nondeterministic transition function ("NTF"). The mapping of time to NTFs can be referred to as a waveform set function (WSF). Each NTF relates a previous state of a waveform or set of waveforms to a set of possible next states. Although separated by a few layers of constructs, the compact multi-waveform representations mentioned earlier are based upon sequences of these NTFs. The NTFs, which can be considered the building blocks, will be first described. Constructs that build upon these NTFs will then be described. FIG. 2 depicts an example hierarchy of data constructs/objects built upon NTFs revealing relationships between the previously mentioned phase tags and NTFs. FIG. 2 will be explored in more detail after describing the data constructs individually. Various example NTFs are described in detail in the U.S. Patent Application Ser. No. 61/912,345, filed on Dec. 5, 2013, entitled "DETECTION OF CLOCK DOMAIN CROSSINGS AND POTENTIAL DEFECTS IN A CIRCUIT DESIGN AT THE REGISTER TRANSFER LEVEL."

When propagating compact multi-waveform representations throughout a design, the compact multi-waveform representations are decomposed into the NTFs in order to apply the appropriate NTF operators upon the constituent NTFs. The NTF operators correspond to operations of circuit components (e.g., ntf_and that corresponds to an AND operation of NTFs) and some operations employed for coherency (e.g., ntf_fix_adjacent and ntf_is_subset). The operations can be implemented with look ups, because the look up tables are constructed based on the signal behavior represented by the NTFs and the foundational functions that capture transitional behavior.

Each phase type can be considered a construct (e.g., variable or notation) that represents a set of waveforms as a function of a non-specific virtual clock, as mentioned above. A phase type group represents one or more phase types. For example, the phase type group GCE represents a grouping of two phase types. Phase type groups can be used to differentiate among phase types that have the same Clocked Waveform Set Specification (CWSS).

Phase type operators operate upon the higher level construct of phase types by invoking the operators of lower level constructs. Since phase types correspond to sets of waveforms, the phase type operators represent operations on sets of waveforms. Each phase type is associated with a CWSS and a phase type group. Each CWSS is comprised of NTFs. Each NTF is based upon a WSF, which, in turn, represents a set of multiple waveforms. The five phase type group operators can be identified by example function names. The phase type group operators indicate possible output referred to herein as meta-phase type groups (meta-PTGs). A meta-phase type group is a grouping of phase type groups. Meta phase type groups are implemented to specify results of phase type group operations that conform to the rules specified herein. Phase type groups allow for the compact representations of multiple waveforms because the group identifiers can be used to disambiguate a sequence of nondeterministic signal transition representations that map to different phase types.

FIG. 2 is a conceptual diagram that depicts an example hierarchy of relationships among data constructs. Depending on the programming language and particular literature, a data construct can be referred to as a class, an object, a structure, etc. This example data construct 200 includes several elements or members that define the structure of the class and behavior of the class. The structure of this data construct 200 is defined by the following members: NTFs 208, CWSSs 216, phase type groups 220, meta phase type groups 224, phase types 232, phase tags 236, mode expressions 240, mode independent phase expressions (MIPEs) 244, phase expressions 248, reduced orthogonal list of conditional MIPE pairs (ROLCMPs) 222, and phase ids 226. The behavior of the data construct 200 is defined by functions or operators that operate on the depicted members: NTF operators 260, CWSS operators 264, phase type group operators 268, phase type operators 272, phase tag operators 276, mode operators 280. MIPE operators 284, phase expression operators 288, and phase id operators 292. Subsequent figures provide additional detail regarding each illustrated member and operator.

FIG. 2 depicts a waveform set function (WSF) 204 as supporting the NTF data construct 208. The WSF 204 is depicted with a dashed line because the WSF 204 may not be explicitly defined in a data construct. An NTF data construct can be defined in a class, for example, based on assumptions that rely upon a WSF without explicitly indicating the mappings from each unit of time to an NTF.

A CWSS 216 is a sequence of NTFs 208. Together with a virtual clock 212, a CWSS 216 defines sets of waveforms 228. The virtual clock 212 is also depicted with a dashed line because this may not be explicitly defined in a data construct. The information for a virtual clock (e.g., timing parameters) can be assumed or implied by the CWSS data construct 216. The NTF operators 260 manipulate each NTF 208 that comprises an instance of a CWSS 216, thereby manipulating the CWSS 216 instance.

A user applies phase tags 236 or phase expressions 248 to the primary inputs and the outputs of clock generators in a circuit design. Operations are performed on these phase tags 236 or phase expressions 248. When the operations are performed, the phase tags 236 or phase expressions 248 are propagated throughout a design, and the resulting phase tags 236 or phase expressions 248 can be analyzed to identify possible design defects or particular design characteristics. A phase tag 236 or phase expression 248 is propagated throughout the circuit design by transforming input phase tags or input phase expressions received at primary inputs and outputs of clock generators in a circuit design through the previously discussed look up tables so that each output net of the circuit design includes a phase tag 236 or phase expression 248.

A phase type 232 is a generalized version of a phase tag 236. While a phase tag 236 can be associated with a particular virtual clock 212, a phase type 232 is a generalized expression representing a set of waveforms 228. As with the other variable types, a phase type 232 can be manipulated through phase type operators 276. A phase type 232 is associated with a clocked waveform set specification (CWSS) 216 and a phase type group 220.

As previously mentioned, multiple phase types 232 can be associated with the same CWSS 216. A phase type group 220 distinguishes such phase types 232, and can distinguish characteristics of signals represented by phase types 232, such as clock signals as compared to data signals. Certain phase type groups 220 can be constituent elements of a meta phase type group 224. Phase type groups 220 and meta phase type groups 224 can be manipulated through phase type group operators 268.

Phase tags 236 and phase expressions 248 themselves are comprised of lower level data constructs (e.g., CWSSs) and also can be converted into different data constructs on which operations are executed. A phase expression 248 is comprised of zero or more mode expressions 240 and one or more MIPEs 244.

A mode expression 240 represents a condition in which a design can operate among multiple modes. A mode is a Boolean function of the value of a signal in the design. A mode can represent a selection between a first signal and a second signal that is different from the first signal. For example, a design might include a dual input multiplexer, such as describe above with reference to FIG. 1. A first input to the multiplexer might be a first clock signal and a second input to the multiplexer might be a second clock signal that is asynchronous to the first clock signal. The multiplexer can receive a selector signal that causes it to select between the first signal and the second signal. In the example of FIG. 1, the design includes a mode, which can be represented via a mode expression 240. Operations can be performed on the mode expressions 240 through the mode operators 280.

A MIPE 244 is comprised of one or more phase tags 236. A MIPE 244 represents a set of waveforms 228 that is a function of the sets of waveforms 228 represented by the constituent phase tags 236 of the MIPE 244. Operations can be performed on a MIPE 244 through the MIPE operators 284.

A phase expression 248 can be converted into a reduced orthogonal list of conditional MIPE pairs 222, designated as a ROLCMP 222. A ROLCMP 222 is a data construct that enables phase expressions 226 to be converted into phase ids 226. A phase id 226 is a numerical handle associated with a phase expression 248, enabling phase expressions 248 to be more easily manipulated. Subsequent sections of this specification describe converting a phase expression 248 into a ROLCMP 222, and converting a ROLCMP 222 into a phase id 226.

A phase tag 236 represents a set of waveforms 228 via CWSSs. In some cases, a phase tag 236 can be associated with a virtual clock 212. Syntactically, if a phase tag 236 is associated with a virtual clock 212, the phase tag will follow a syntax which includes the name of the virtual clock 212. One such syntax can be represented as "Clock Name@Type of Clock Signal." For example, the phase tag 236 "A@L" designates the waveform set 228 associated with a latch clocked by the leading phase of virtual clock "A." However, in other cases, a phase tag 236 may not be associated with a virtual clock 212. For instance, the phase tag "*" designates the set of all possible waveforms 228. Phase tags 236 can be manipulated via phase tag operators 276. Phase tag operators 276 implement operations on phase tags 236. A phase tag 236 can be employed to distinguish among a type of signal, such as whether a signal is a clock signal, a data signal (e.g., latch driven signal), or a constant; a type of clock, such as a level, pulse, or delayed clock and inverted versions of each; and a phase of data, such as leading, trailing, or a combination.

As mentioned earlier, a phase type 232 is a generalized expression representing a set of waveforms 228. For example, a phase tag 236 such as "A@L" can be generalized to the phase type "C@L," which represents a set of waveforms 228 associated with a leading-phase-clocked latch clocked by any clock C. In some instances, a phase tag 236 conflates with the concept of a phase type 232.

As discussed above, more than one phase type 232 can be represented by identical CWSSs 216. Phase type groups 220 can distinguish phase types 232 that are represented by identical CWSSs 216. Phase type groups 220 can also be implemented to distinguish among classes of signals, such as clock signals, data signals, and combinations of clock and data signals.

Phase expressions 248 can be comprised of mode expressions 240 and MIPES 244. A mode expression 240 is a Boolean function with a mode as its argument. As discussed above, a mode is a Boolean function of the value of a signal in a design. For instance, if a design includes a dual input multiplexer, wherein a first input is a first clock signal and a second input is a second clock signal and a selector signal to the multiplexer causes the multiplexer to select the first or the second clock signal, then a mode expression 240 can represent the conditionality of the multiplexer's output— i.e.—that it is either the first clock signal or the second clock signal depending on the selector signal received at the multiplexer. Syntactically, a mode expression 240 can be specified in Backus-Naur form:

```
<mode_expression> ::= <mode_and_expression> | <mode_expression>
"|"
<mode_and_expression>
<mode_and_expression> ::= <mode_prefix_expression> |
<mode_and_expression> "&" <mode_prefix_expression>
<mode_prefix_expression> ::= <mode_primary_expression> | "~"
<mode_prefix_expression>
<mode_primary_expression> ::= <mode> | "0" | "1" |
"("<mode_expression>")".
```

The mode operators 280 comprise the logical functions NOT, AND, OR, and XOR that can take mode expressions 240 as inputs to generate an output mode expression 240 that has been manipulated via operation of one of the logical functions. For example, a logical function AND can be applied to values of two selection signals.

A MIPE 244 is a string that is comprised of a single phase tag 236 or multiple phase tags 236. In particular, a multi-phase tag 236 MIPE 244 is an expression in which two or more phase tags 236 are joined by a transition-union operator, denoted with the symbol. A MIPE 244 represents a set of waveforms 228 that is a function of the set of waveforms 228 represented by the constituent phase tags 236. Specifically, a MIPE 244 represents the set of all waveforms 228 that have transitions only at times coincident with the times of transitions of waveforms in the sets of waveforms 228 represented by the constituent phase tags 236. Syntactically, a MIPE 244 can be expressed in Backus-Naur form:

```
<mode_independent_phase_expression> ::= <phase_tag> |
<mode_independent_phase_expression> "^" <phase_tag>.
```

For example, the MIPE "A@L^B@L" means the set of waveforms that can transition from the leading edge of either clock A or clock B. The MIPE operators 284 allow operations to be performed on MIPES 244.

Phase expressions 248 model the behavior of designs in which at least one circuit component receives a first clock signal and a second clock signal, wherein the first clock signal is asynchronous to the second clock signal. Additionally, phase expressions 248 model the behavior of designs in which at least one circuit component is capable of selecting a first signal or a second signal.

Syntactically, a phase expression 248 can be expressed in Backus-Naur form as follows:

```
<phase_expressions>:: = <mode_independent_phase_expression>|
<conditional_phase_expression>
<conditional_phase_expression>:: = <mode_expression> "->"
<mode_independent_phase_expression> ":" <phase_expression>.
```

The relationship between a phase expression 248 and the set of waveforms 228 that the phase expression 248 represents is best understood through an example. Consider the example phase expression 248 pe3=m->pe1:pe2, where m is a mode expression 240, pe1 is a MIPE 244, and pe2 is a phase expression 248. The set of waveforms that phase expression pe3 specifies is the set of waveforms w3 such that, for some w1 waveform in pe1 and some w2 waveform in pe2, w3(t)=w1(t) if m is true at time t; otherwise, w3(t)=w2(t). Two phase expressions 248 are equal if the waveform set 228 that each phase expression 248 specifies is the same. In some instances, a phase expression 248 might be optimally expressed in reduced orthogonal form. For example, the phase expression 248 pe=m_1->p_1:m2->p_2: . . . :p_k is in a reduced orthogonal form if four conditions are met: the m_i mode expressions 240 are pairwise orthogonal, meaning that m_i & m_j=0 whenever i does not equal j; none of the m_i mode expressions 240 are constant false Boolean functions, meaning that there does not exist an m_i that equals 0; the mode expression 240 defined by m_k=~m_1 & ~m_2 & . . . & ~m_{k−1} is not the constant false Boolean function, meaning that m_k does not equal 0, and the p_i MIPEs 244 are different from each other.

The phase expression operators 288 implement mathematical operations (i.e. logical operations) on phase expressions 248. For example, the phase expression operators 388 can be used to find the logical AND of a first phase expression 248 and a second phase expression 348. In general, phase expression operators 288 perform operations on phase expressions 248.

Two data types can be deployed to increase computational efficiency in performing calculations with phase expressions 248. One such data type is the phase id 226. A second such data type is the reduced orthogonal list of condition-MIPE pairs (ROLCMP) 222. A phase id 226 is a unique non-negative integer handle associated with a phase expression 248. Phase expressions 248 that are equivalent to one another can be assigned to the same phase id 226. In one embodiment, phase expressions 248 are sequentially assigned to phase ids 226 as the phase expressions 248 are encountered. The ROLCMP 222 data type can be implemented to convert phase expressions 248 to phase ids 226 and vice versa. For example, a rolcmp_to_id data structure can map the canonical ROLCMP form of each phase expression 248 to the phase id 226 assigned to it, and a sequential container id_to_rolcmp can store the canonical ROLCMP 222 data structure for each previously encountered phase expression 348, indexed by phase id 226. Operations can be performed on phase ids 226 through phase id operators 292.

The following flowcharts provide example operation of a phase algebra based design tool that operates with compact multi-waveform representations. These example operations will refer back to the operators and data constructs described herein, and also as described in the tables in the U.S. Patent Application Ser. No. 61/912,345.

Figure 3:
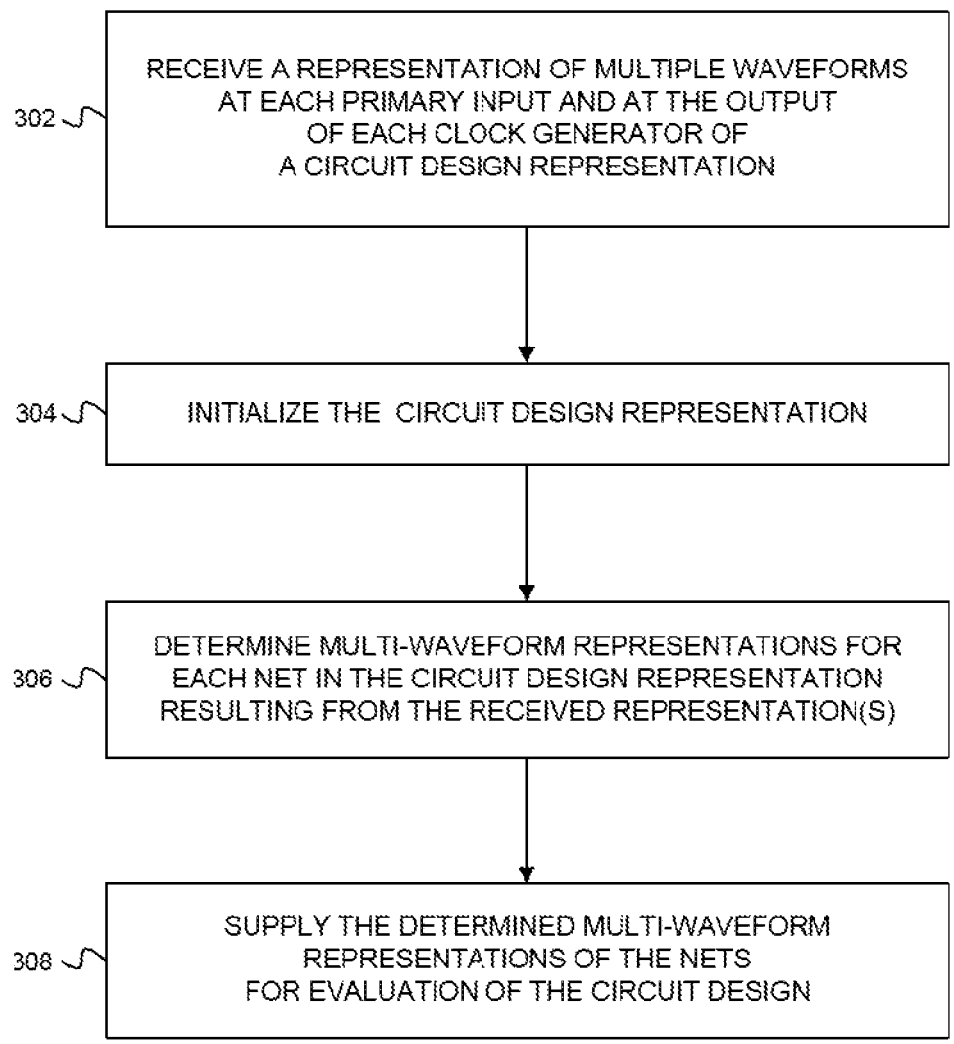
FIG. 3 is a flowchart of example operations for initializing an RTL circuit design representation of phase algebra based evaluation and propagation of compact multi-waveform representations throughout the design representation.

FIG. 3 is a flowchart of example operations for initializing a circuit design representation of phase algebra based evaluation and propagation of compact multi-waveform representations throughout the design representation. At block 302, a representation of multiple waveforms is received at each primary input and at the output of each clock generator of a circuit design representation. For instance, a phase tag or phase expression is associated with a primary input of a circuit design representation. At block 304, the circuit design representation is initialized to prepare the circuit design representation to accept propagated multi-waveform representations. The initialization marks nets for propagation operations. At block 306, the multi-waveform representations are determined for each of the nets in the RTL circuit design resulting from the received multi-waveform representation. For example, operators are applied to determine output phase tags based on the various circuit components modeled in the circuit design representation. At block 308, the determined multi-waveform representations are supplied for evaluation of the RTL circuit design.

As discussed earlier, higher level data constructs (e.g., phase tag) are decomposed into lower level data constructs (e.g., NTFs) in order to apply operations of circuit components modeled in the circuit design representation. These operations often yield a sequence of NTFs or a CWSS that is converted back into a phase type in order for propagation to continue or determine an output to associate with a net for later defect analysis. An output phase type can be determined based on a received input CWSS and a received input phase tag group or meta phase tag group.

Figure 4:
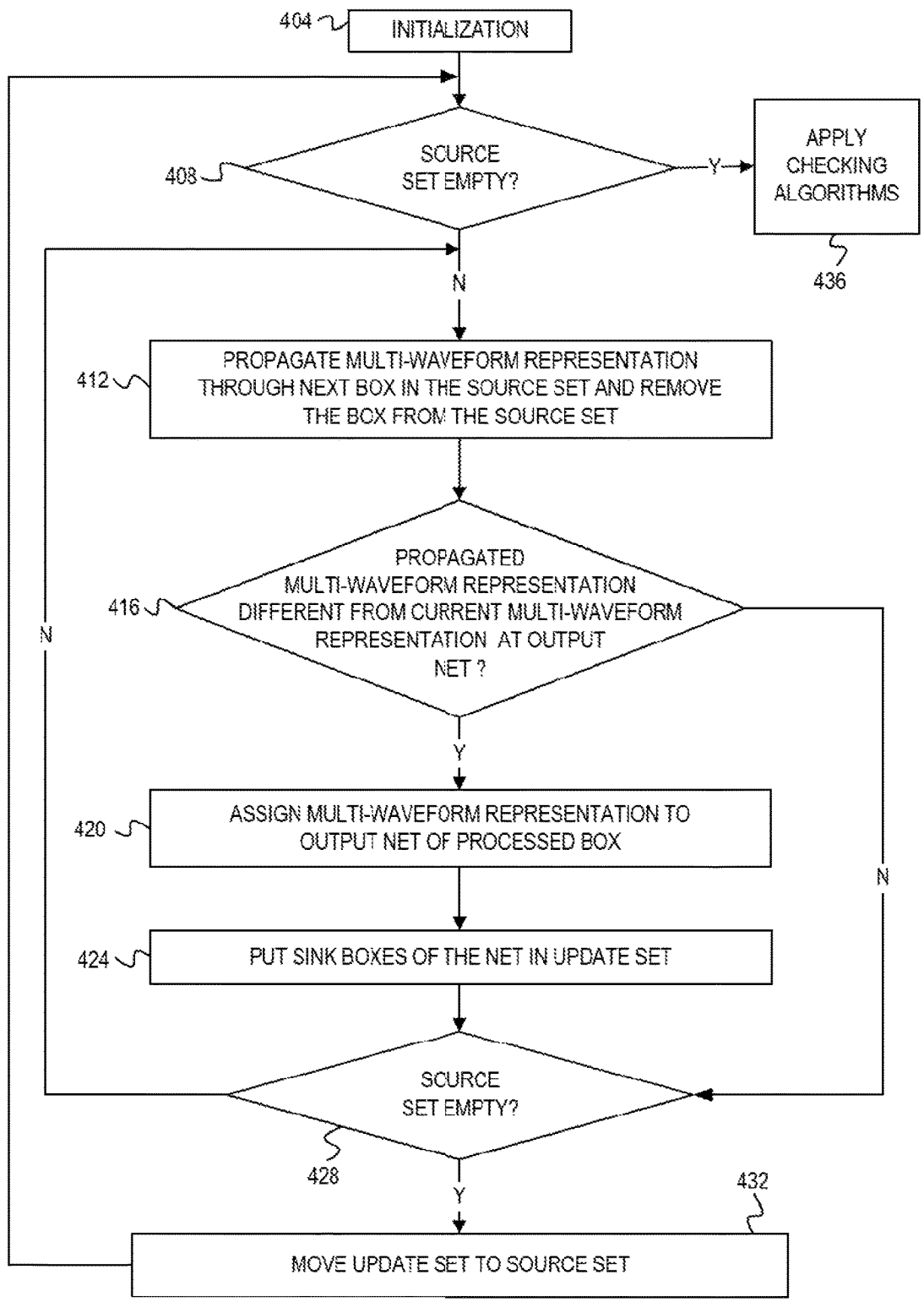
FIG. 4 is a flowchart of example operations for propagating multi-waveform representations after initialization of an RTL circuit design representation.

FIG. 4 is a flowchart of example operations for propagating multi-waveform representations after initialization of a circuit design representation. At block 404, the circuit design representation is initialized, such as discussed in the U.S. Patent Application Ser. No. 61/912,345. In some cases, the initialization algorithm converts all phase expressions to phase ids. With relation to FIG. 1, terminology associated with the example propagation algorithm will be described.

The flip-flop 124 and the AND gate 128 are referred to as boxes. A box is a component of a register transfer level circuit design. The connectors 150, 158, 156, and 160 represent nets. The boxes 124 and 128 can also be referred to as nodes. The connector 150 is the input net to flip flop 124, and the connector 158 is both the output net from the flip flop 124 and the input net to the AND gate 128. The propagation algorithm can determine an output phase id, which will appear at the net 158. The AND gate 128 can be referred to as the sink box of net 158. In one embodiment, a source set and an update set can be established. The source set and update set can be data structures that store information about the status of each box in a circuit design representation. For example, the source set might include boxes that are to be processed by the current iteration of the propagation algorithm. The update set can include boxes that are to be processed by the next iteration of the propagation algorithm. The propagation algorithm is further described in the U.S. Provisional Patent Application Ser. No. 61/912,345. The propagation algorithm is also described in the U.S. patent application Ser. No. 14/327,658. At block 408, a source set is checked to determine whether it is empty. If the source set is empty, then the propagation process is complete and the flow proceeds to block 436. At block 436, checking is applied to the resulting multi-waveform representation propagated throughout the design. The checking algorithms use the generated phase ids to identify particular characteristics associated with a design, some of which can be potential defects. If the source set was not empty at block 408, the flow proceeds to block 412.

Figure 5:
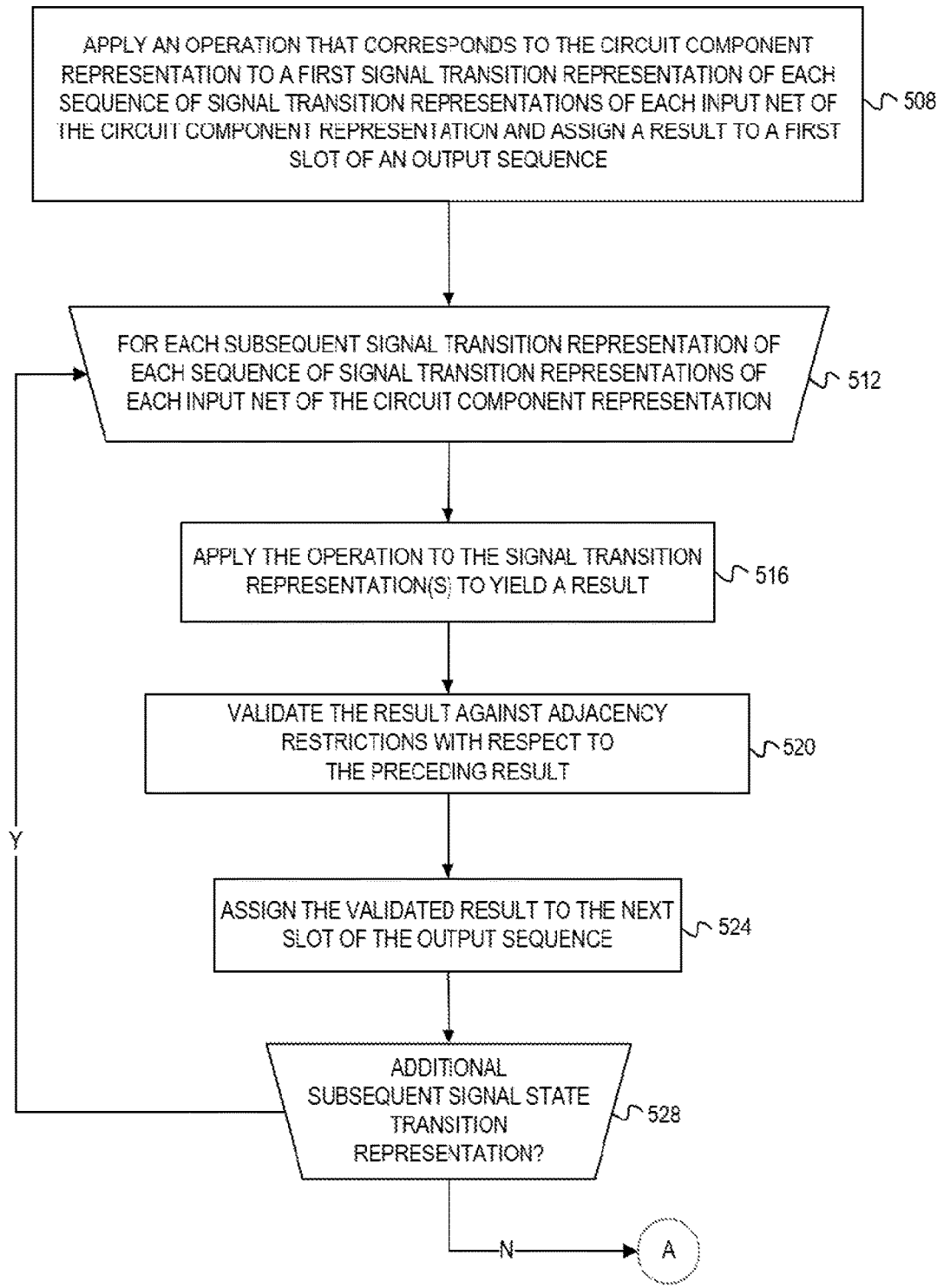
FIGS. 5 and 6 are flowcharts of example operations for applying circuit component based operations to sequences of signal transition representations.
Figure 6:
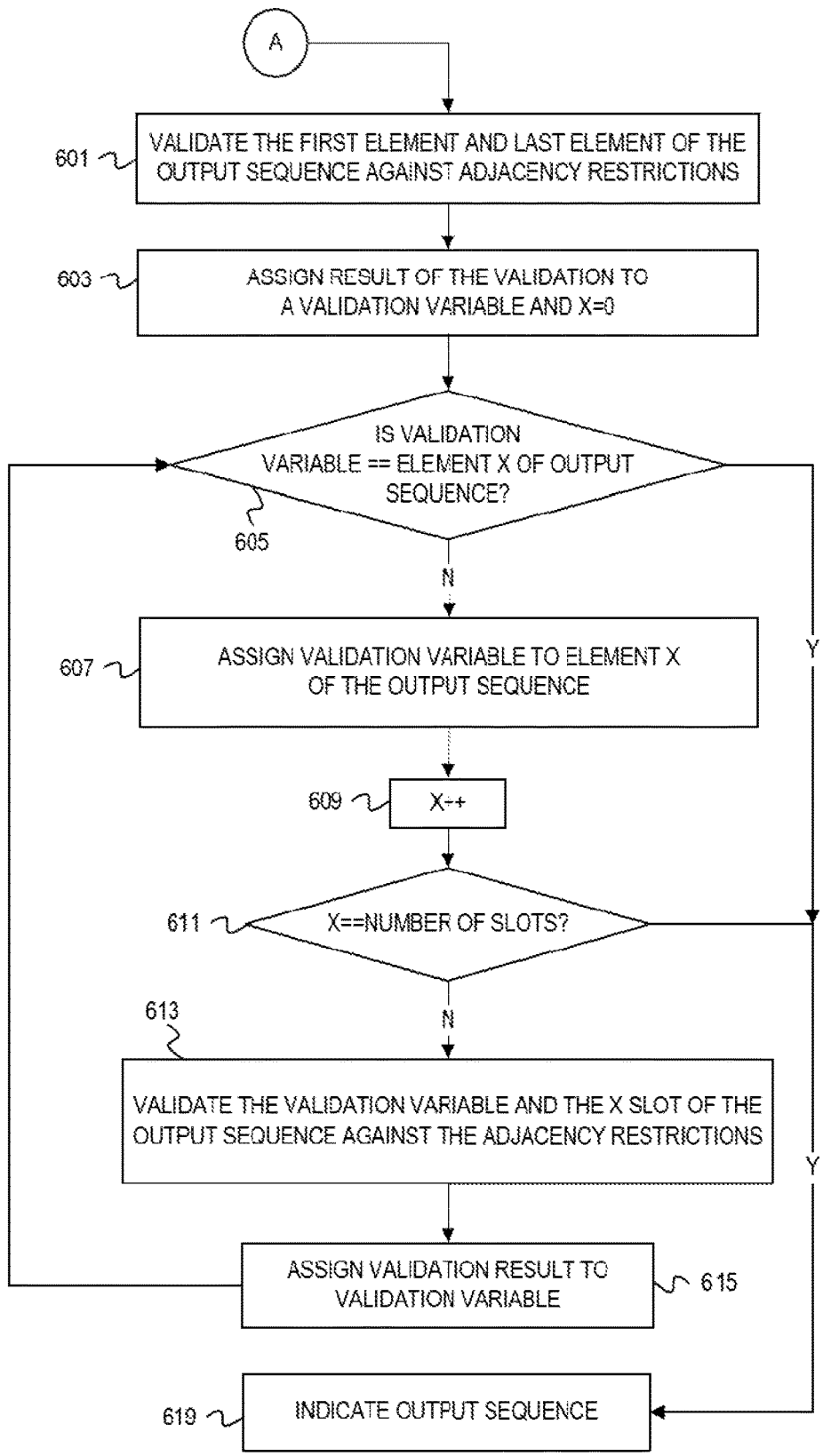

At block 412, an input multi-waveform representation is propagated through the next box in a source set and the processed box is removed from the source set. For example, an input phase id is used to search for a result phase id in a lookup table. If a result phase id is found in the lookup table, then the result phase id is returned, and the process proceeds to block 416. The particular look up tables accessed will vary dependent upon the phase id and the operation (e.g., AND, OR, etc.) represented by the box. More details are provided by FIGS. 5 and 6. FIG. 5 presents example operations for particular logic, while FIG. 6 presents example operations for enforcing adjacency restrictions. However, if a result phase id is not found in the lookup table, then the input phase id is converted to a ROLCMP in accordance with the phase id look-up algorithm. Operations then can be performed on the ROLCMPs. Phase expressions can be derived from the ROLCMP operations. The phase expressions can be converted into phase ids. The process proceeds to block 416.

At block 416, the multi-waveform representation resulting from block 412 is compared to the multi-waveform representation currently associated with the output net of the processed box. If the resulting multi-waveform representation is different from the current multi-waveform representation, the flow proceeds to block 420. Otherwise, the process proceeds to block 428.

At block 420, the multi-waveform representation resulting from block 412 is assigned to the output net associated with the processed box. At block 424, the sink boxes of the net are placed in the update set.

At block 428, the source set is checked to determine whether it is empty. If the source set is not empty, then the flow again proceeds to block 412 at which a multi-waveform representation is propagated through the next box in the source set, and the flow proceeds. Otherwise, the flow proceeds to block 432. At block 432, the source set is overwritten with the contents of the update set. The flow proceeds to block 408.

FIGS. 5 and 6 are flowcharts of example operations for applying circuit component based operations to sequences of signal transition representations. For instance, a tool applies an operation for an AND component, an operation for an XOR component, etc. Examples of the component based operators include the CWSS operators cwss_and, cwss_xor, cwss_trans_latch, and cwss_trans_latch_const.

As the tool analyses each circuit component representation of the circuit design representation, the tool invokes program code corresponding to the circuit component representation. When the program code is invoked, the operations begin at block 508.

At block 508, an operation that corresponds to the circuit component representation is applied to a first signal transition representation of each sequence of signal transition representations of each input net of the circuit component representation. The result of applying the operation that corresponds to the component is assigned to a first slot of an output sequence. For example, if a circuit component is an AND gate, the NTF operator ntf_and can be invoked. The ntf_and operator receives a first NTF and a second NTF associated with the first slot of each CWSS that is an input to input nets of the AND gate. The result of applying the foregoing can be assigned to the first slot of an output sequence. For instance, the result of applying the ntf_and operator to the first NTF associated with each input CWSS can be applied to the first slot of the output CWSS sequence. The flow proceeds to block 512.

At block 512, a process that iterates through each subsequent signal transition representation of each sequence of each input net begins.

At block 516, the operation is applied to the signal transition representations to yield a result. For instance and continuing with the AND gate example, the process iterates through the second through eighth slot of each input CWSS applied to the AND gate, invoking the ntf_and operator. The flow proceeds to block 520.

At block 520, the results of the block 516 are validated against adjacency restrictions. For example, each output NTF can be validated to confirm that such output NTF conforms to the NTF adjacency restrictions. If it does not conform, then the NTF is adjusted.

At block 524, the validated result is assigned to the next slot of the output sequence. For example, a validated output NTF can be assigned to the appropriate output CWSS slot.

At block 528, it is determined whether there exist additional subsequent signal transition representations to process. If any additional subsequent signal transition representations remain, then the process returns to block 512. Otherwise, the flow proceeds to block 601 in FIG. 6.

At block 601, the first element and last element of the output sequence are validated against adjacency restrictions. The flow proceeds to block 603.

At block 603, the results of the validation are assigned to a validation variable and an index X is set equal to 0. The index X is used to progress through each element of the output sequence.

At block 605, it is determined whether the validation variable equals the element of the output sequence that corresponds to the location of the index X. If the validation variable equals the element of the output sequence that corresponds to the location of the index X, then the flow proceeds to block 619, where the output sequence is indicated. Otherwise, the flow proceeds to block 607.

At block 607, the validation variable is assigned to the element of the output sequence that corresponds to the location of the index X. The flow proceeds to block 609.

At block 609, the index X is incremented. The flow proceeds to block 611.

At block 611, it is determined whether the index X has reached the end of the output sequence by testing whether X equals the number of slots. If the foregoing is true, then the flow proceeds to block 619 at which the output sequence is indicated. Otherwise, the flow proceeds to block 613.

At block 613, the validation variable and the slot of the output sequence that corresponds to the location of the index X are validated against the adjacency restrictions. The flow proceeds to block 615.

At block 615, the validation result is assigned to the validation variable. The flow returns to block 605 from block 615.

The methods described above with reference to FIGS. 4-6 can be also applied to circuit design representations that include one or more modes, such as shown in FIG. 1. The methods of FIGS. 4-6 can be applied to the circuit design representation of FIG. 1 to generate multiple phase expressions that include multiple modes. For example, phase expression 134 of "TEST->A@LGF:0" is a phase expression that includes two MIPES ("A@LGF," and "0") and a mode expression ("TEST"). The syntax of the phase expression that includes a mode expression, such as of phase expression 134, is described above with reference to FIG. 2.

For example, the phase algebra based evaluation tool propagates the phase tag "A" 118 and the phase tag "B" through the multiplexer 126 as being dependent on the value of the "TEST->1:0" phase expression 122. Thus, the phase expression 130 indicates that the value could be "A" or "B," depending on the value of the signal TEST that is received at the input of the multiplexer. Similarly, the phase expression 134 indicates that the value could be "A@LGF" or "0," depending on the value of the signal TEST that is received at the input of the AND gate. Thus, a computer program that implements the disclosure described herein generates the output phase expressions "A@LPGF" 132, "TEST->A@LGF:0" 134, and "TEST->A:B" 130. These phase expression outputs can be provided to the checking algorithms described elsewhere in this application to detect characteristics associated with the design.

Phase Expression Operators

Figure 7:
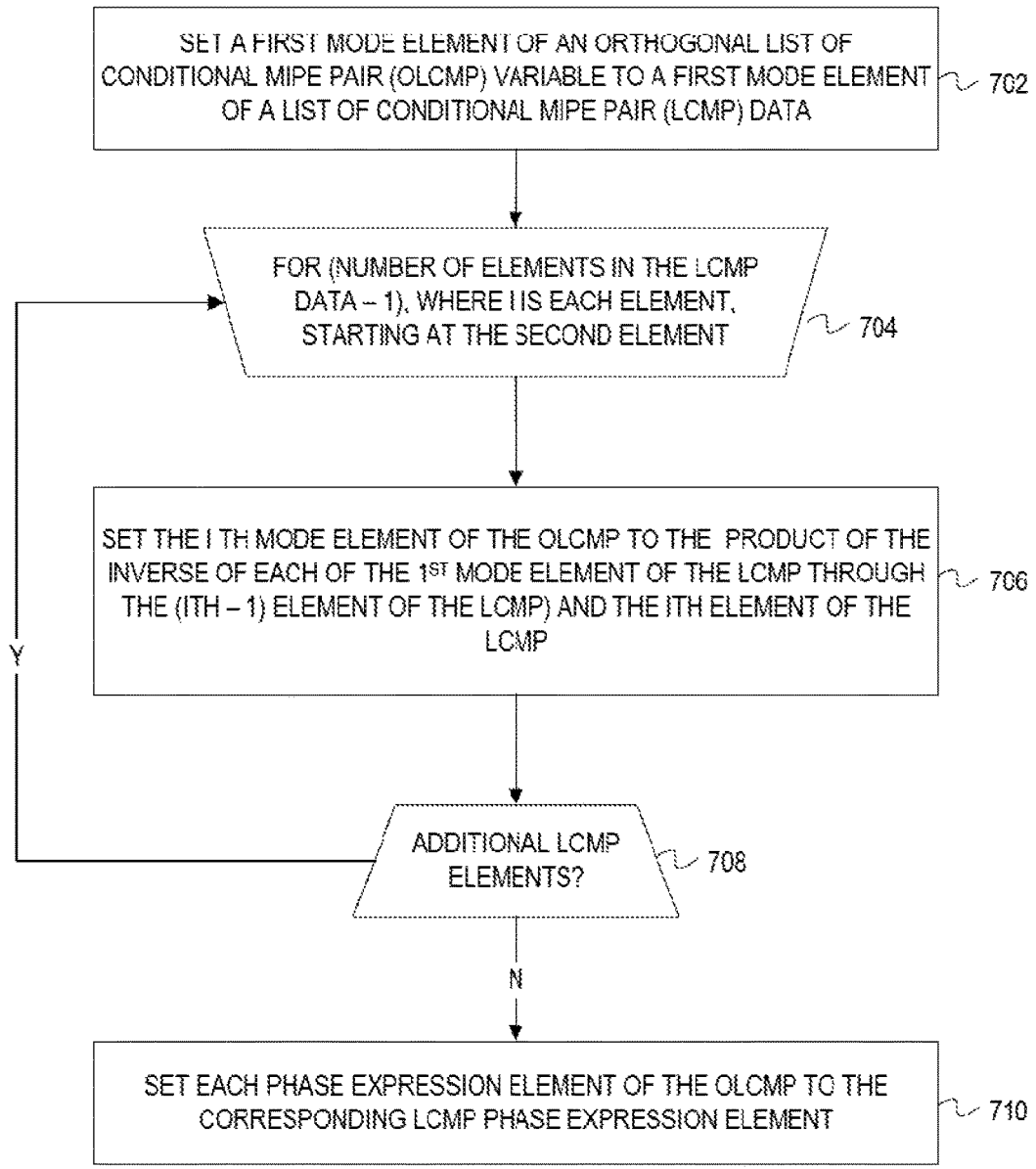
FIG. 7-9 are flowcharts of example phase expression operators.
Figure 8:
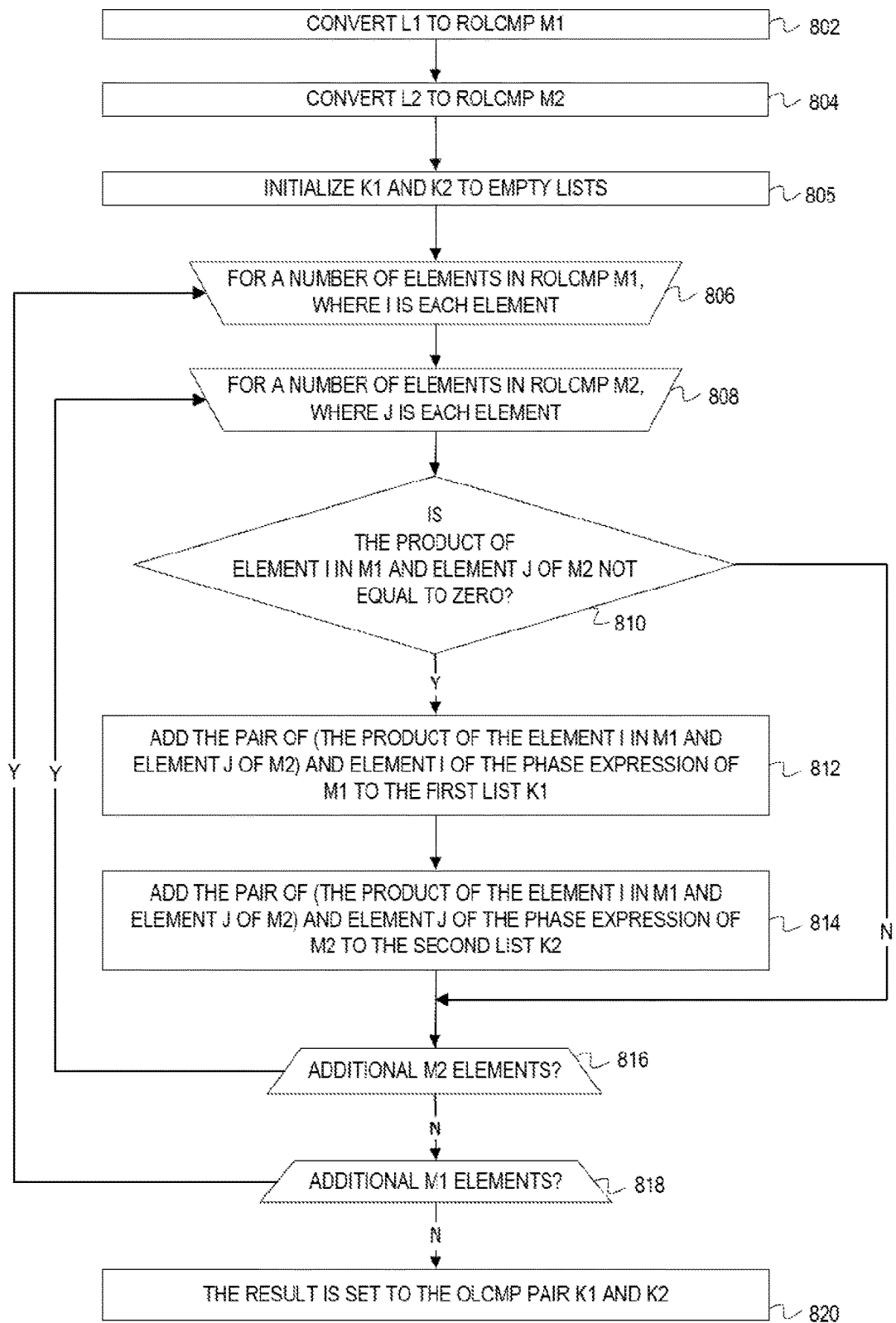

FIG. 7 includes an example algorithm to convert a list of conditional MIPE pairs (LCMP) to an orthogonal LCMP (OLCMP). FIG. 8 includes an example algorithm to refine the OLCMP data type. The example algorithms of FIGS. 7 and 8 can be employed to implement the phase expression operators discussed in FIG. 9. A list of conditional MIPE pairs (LCMP) is a nonempty list of pairs, ((m_1, p_1), (m_2, p_2), ..., (m_k, p_k)), where each m_i ($1 \leq i \leq k$) is a mode expression, each p_i is a MIPE, and the disjunction (logical OR) of the mode expressions, m_1|m_2| ... |m_k, is equal to 1. Such an LCMP represents the phase expression P=m_1->p_1:m_2->p_2: ... :p_k.

Similarly, a phase expression P=m_1->p_:m_2->p_2: ... :p_k can be represented as the LCMP L=((m_1, p_1), (m_2, p_2), ..., (m_k, p_k)) where m_k is equal to 1. Through this technique, any phase expression can be converted into an LCMP or vice versa. An orthogonal LCMP (OLCMP) is an LCMP in which the mode expressions are pairwise orthogonal, meaning that given any m_i and m_j, where $1 \leq i < j \leq k$, m_i AND m_j=0.

In one embodiment, at block 702, a first Mode element of an orthogonal list of conditional MIPE pair (OLCMP) variable is set to a first Mode element of a list of conditional MIPE pair (LCMP) Data. A for loop of block 704 performs blocks 706 and 708 for all but the first element in the LCMP data, where i indicates each element. At block 706, the ith mode element of the OLCMP is set to the product (logical AND, or conjunction) of the inverse of each of the 1st mode element of the LCMP through the (i−1) element of the LCMP) and the ith element of the LCMP. At block 708, it is determined whether there are additional LCMP elements. If there are additional LCMP elements, the for loop of block 704 is performed again, and the counter i of the for loop can be incremented. If there are no additional LCMP elements, block 710 is performed. At block 710, each phase expression element of the OLCMP is set to the corresponding LCMP phase expression element.

A reduced orthogonal LCMP (ROLCMP) is an OLCMP in which none of the mode expressions m_i is equal to 0, and no two MIPEs are equivalent. Thus, an OLCMP can be converted into an ROLCMP by removing any pairs containing the mode expression 0, and by repeatedly replacing any two pairs (n_i, p_i), (n_j, p_j) for which p_i=p_j with the pair (n_i|n_j, p_i). By employing this procedure and an algorithm implementing the method of FIG. 7, any phase expression P can be converted to a ROLCMP. Any ROLCMP is also an OLCMP; any OLCMP is also an LCMP; and any LCMP can be converted to a phase expression as stated above. Thus any ROLCMP can be converted to a phase expression. A phase expression converted from an ROLCMP will be in reduced orthogonal form as defined earlier.

An example algorithm implementing the method of FIG. 8 refines an OLCMP. In particular, the phase expression operators implement an adaption of the ROLCMP data type referred to as the ROLCMP refinement. Given a ROLCMP L1=((m_1, p_1), ..., (m_r, p_r), the ROLCMP L2=((n_1, q_1), ..., (n_s, q_s)) is a refinement of L1 if r≤s and for any pair (i, j) such that i≤r and j≤s one of the following is true: either m_i & n_j=0; or m_i & n_j=n_j and p_i=q_j. Given two reduced OLCMPs L1 and L2, the OLCMP pair (K1, K2) is a common refinement of the OLCMP pair (L1, L2) if K1 is a refinement of L1, K2 is a refinement of L2, and the mode expressions included in K1 and K2 are identical disregarding their order. The OLCMP pair (K1, K2) is the coarsest common refinement of (L1, L2) if for each (J1, J2) common refinement of (L1, L2), (J1, J2) is also a common refinement of (K1, K2). Given the foregoing definitions, the example algorithm delineated in FIG. 8 can be employed to find the coarsest common refinement of an OLCMP pair (L1, L2).

In one embodiment, at block 802, an OLCMP L1 is converted to ROLCMP form, where the result is an ROLCMP expression M1 of the form ((m_1, p_1), ..., (m_r, p_r)). At block 804, an OLCMP L2 is converted to ROLCMP form, where the result is an ROLCMP expression M2 of the form ((n_1, q_1), . . . , (n_s, q_s)). At block 805, lists K1 and K2 are initialized to be empty lists.

A for loop of block 806 performs blocks 808-818 for a number of elements in the first ROLCMP expression M1, where i indicates each element. A for loop of block 808 performs blocks 810-816 for a number of elements in the second ROLCMP expression M2, where j indicates each element.

At block 810, it is determined whether the product (meaning logical AND, or conjunction) of the mode expression component of element i in the first ROLCMP and the mode expression component of element j of the second ROLCMP is not equal to zero. If it is determined that the product is equal to zero, block 816 is performed next. If it is determined that the product is not equal to zero, block 812 is performed.

At block 812, the pair of (the product of the mode expression component of element i in the first ROLCMP and the mode expression component of element j of the second ROLCMP) and the phase expression component of element i of the first ROLCMP is added to the first list K1.

At block 814, the pair of (the product of the mode expression component of element i in the first ROLCMP and the mode expression component of element j of the second ROLCMP) and the phase expression component of element j of the second ROLCMP is added to the second list K2.

At block 816, it is determined whether there are additional second ROLCMP elements. If there are additional second ROLCMP elements, block 808 is performed again, and counter j can be incremented. If there are no additional second ROLCMP elements, block 818 is performed.

At block 818, it is determined whether there are additional first ROLCMP elements. If there are additional first ROLCMP elements, block 806 is performed again, and counter i can be incremented. If there are no additional first ROLCMP elements, block 820 is performed.

At block 820, the result is set to the OLCMP pair (K1, K2). In other words, the OLCMP pair (K1, K2) is the coarsest common refinement of the OLCMP pair (L1, L2).

Figure 9:
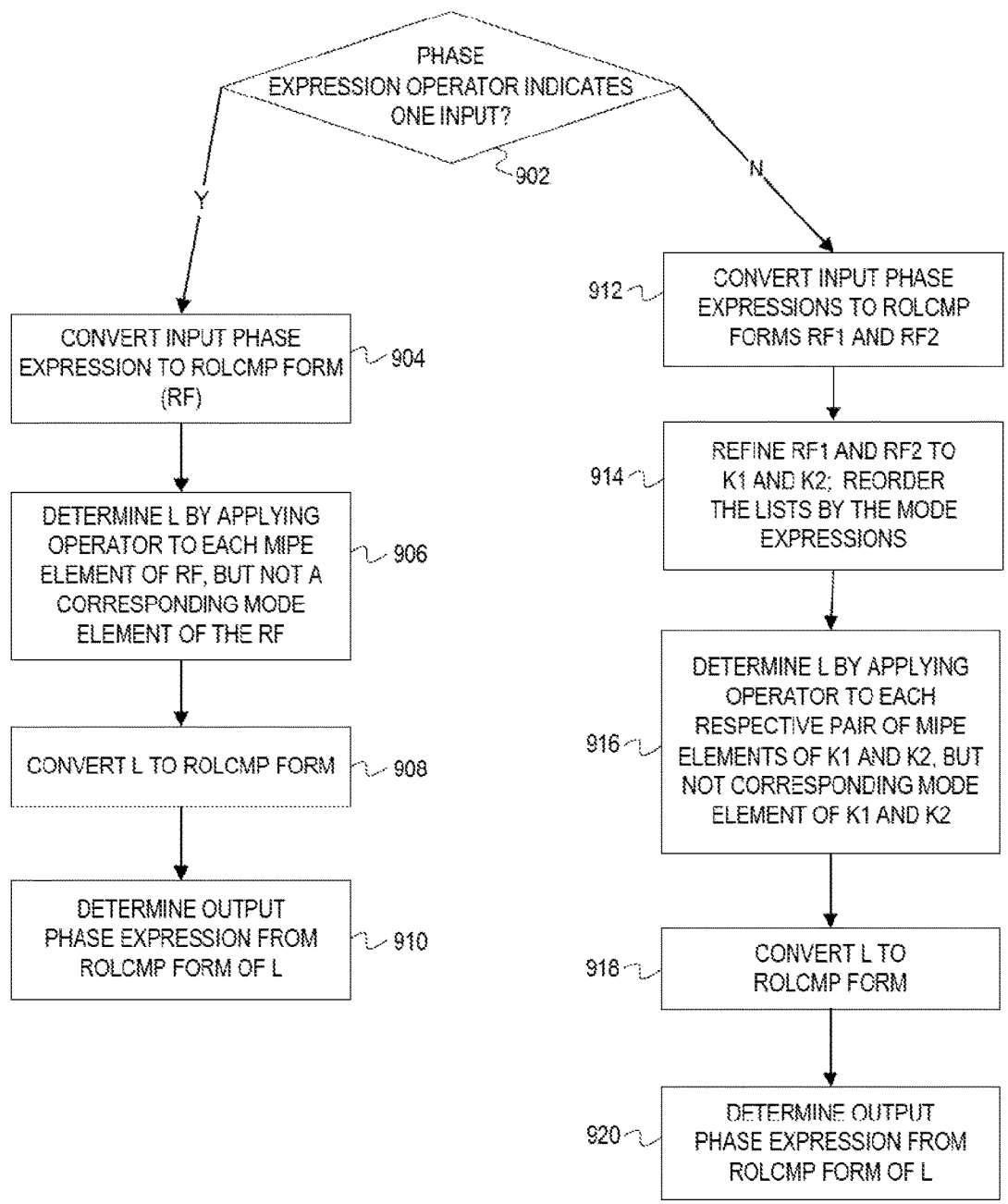

FIG. 9 employs the OLCMP refinement algorithm to convert input phase expressions to output phase expressions. The phase expression operators correspond to the circuit components and the other operators introduced in the disclosure. As noted in FIG. 9, there are two categories of phase expression operators. The first category applies to single input operands, corresponding to the buffer, inverter, unit-delay block, and path delay-block. The second category applies to dual input operands, corresponding to the AND, XOR, latch and flip-flop circuit components. It is noted that additional categories having additional number of input operands are contemplated, and the two categories are included herein for the ease of explanation.

A first category of phase expression operators for single input operands employs the syntax R=OP (A), where R is the output phase expression and A is an input phase expression. A second category of phase expression operators for dual input operands employs the syntax R=OP(A, B), where R is the output phase expression and A and B are the input phase expressions. The OP expression is simply a placeholder for the operator that corresponds to the circuit component associated with the received phase expression inputs. For example, the phase expression operator associated with an AND gate is R=AND(A,B).

FIG. 9 discusses example algorithms to implement each category of phase expression operator. Each algorithm of FIG. 9 can employ the ROLCMP data type discussed in FIG. 2. Additionally, the algorithm for the dual input phase expression operators employs the coarsest common refinement concept of FIG. 8. Although mathematical (i.e. logical) operations can be performed on phase expressions through the phase expression operators of FIG. 9, one implementation of the disclosure uses the phase id data type discussed in FIG. 2.

In one embodiment, at block 902 it is determined whether a phase expression operator indicates one input. If it is determined that the phase expression operator indicates one input, block 904 is performed. If it is determined that the phase expression operator does not indicate one input, block 912 is performed. It is noted that it is assumed that the phase expression operator indicates either one or two inputs.

At block 904, the input phase expression is converted to ROLCMP form, referred to as RF. At block 906, a list of condition-MIPE pairs L is determined by applying the MIPE operator corresponding to the phase expression operator to each MIPE element of RF, but retaining the mode expression components of RF. It is noted that the MIPE operator is not applied to the mode element of RF. For example, L=((m_1, OP(p_1)), . . . , (m_k, OP(p_k))). The MIPE operators are described in the U.S. Patent Application Ser. No. 61/912, 345, entitled "DETECTION OF CLOCK DOMAIN CROSSINGS AND POTENTIAL DEFECTS IN A CIRCUIT DESIGN AT THE REGISTER TRANSFER LEVEL."

At block 908, L is converted to an ROLCMP form. At block 910, the result R is the phase expression obtained from L. At block 912, the input phase expressions A and B are converted to ROLCMP forms, referred to as RF1 and RF2, respectively. At block 914, the pair (RF1, RF2) is refined to generate the coarsest common refinement, pair (K1, K2), such as by applying the method of FIG. 8 to the pair (RF1, RF2). As noted above, the method of FIG. 8 is referred to as a coarsest common refinement. At block 914, the elements of each of K1 and K2 can be also re-ordered such that mode expressions of K1 and K2 appear in the same order. For example, a re-ordered K1 can include ((m_1, p_1), . . . , (m_r, p_r), where m_1 is the first mode. Similarly, a re-ordered K2 can include ((m_1, q_1) . . . . (m_r, q_r), where m_1 is the first mode.

At block 916, a list of condition-MIPE pairs L is determined by applying the MIPE operator corresponding to the phase expression operator to each pair of MIPE elements of K1 and K2, respectively. It is noted that the MIPE operator is not applied to the mode elements of K1 or K2. For example, L=((m_1, OP(p_1, q_)), . . . , (m_k, OP(p_k, q_k))). At block 918, L is converted to an ROLCMP form. At block 920, the result R is the phase expression obtained from L.

Checking Methods

FIGS. 10-15 include example checking methods that can check for the presence of particular characteristics, such as mode constraints, in a design. The methods of FIGS. 10-15 can use the phase expression or phase tag outputs generated through the above described processes to determine whether particular characteristics exist in the design. A mode constraint is a mode expression that indicates the condition under which the checks of the methods of FIGS. 10-15 are to be made. In some embodiments, a mode constraint can be used to restrict such checks to allowable mode combinations (also referred to as legal mode combinations), i.e., only combinations that are allowed to occur during operation of the circuit. The methods of FIGS. 10-15 are applied after the propagation algorithm has assigned an output phase id or phase tag to each net of a computer readable design.

However, these methods can be adapted to use the phase id outputs generated from the above described processes as inputs.

Figure 10:
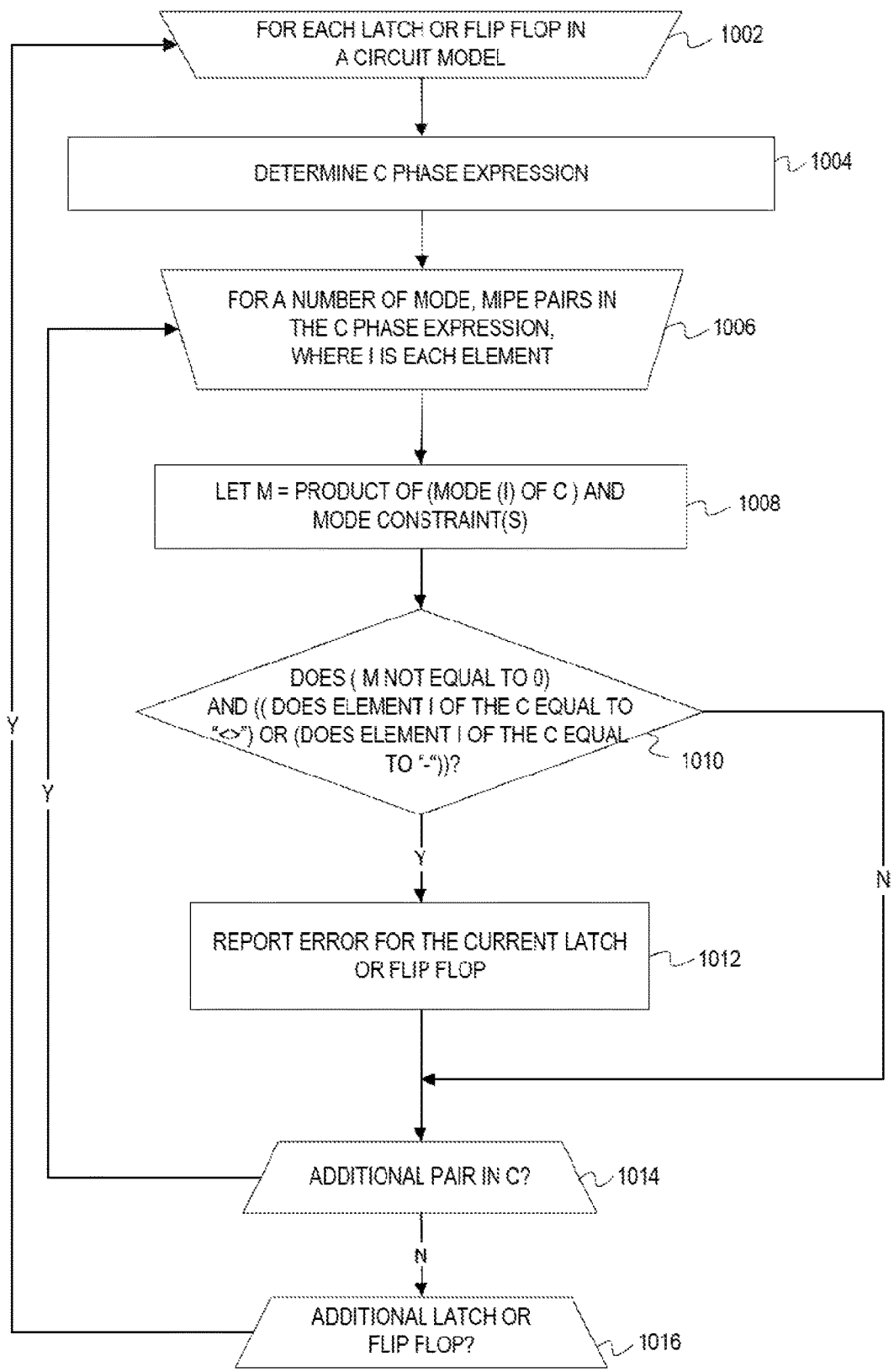
FIGS. 10-15 are flowcharts of example checking methods that can check for a presence of particular characteristics, such as mode constraints, in a design.

The method of FIG. 10 can determine whether phase expressions have been adequately assigned to classify each transparent latch or flip-flop in a design by clock domain. In one embodiment, an algorithm implementing the method of FIG. 10 iterates through each transparent latch or flip-flop of a computer readable design. The phase expression at the clock input of each transparent latch or flip-flop can be assigned in ROLCMP form to a variable C. In one embodiment, the phase expression assigned to the variable C can be a phase expression generated through the propagation algorithm and converted to a phase expression from a phase id.

The algorithm can iterate through each condition-MIPE pair (m_i, c_i) that is a constituent element of the variable C. In iterating through each condition-MIPE pair (m_i, c_i), the algorithm can determine the result of applying the AND mode operator to the mode expression component of the pair, m_i and any mode constraints that have been applied to the design, storing the result of this operation in a variable M. The algorithm can check the following condition: whether M does not equal 0 and whether the phase expression element c_i in C equals the phase tag "< >" or whether the element c_i equals the phase tag "–". If the foregoing condition is met, then the algorithm can report an unclassified latch error for the particular latch or flip-flop. The algorithm can be executed again for the next latch or flip-flop in the design, until each latch or flip-flop in the design has been analyzed.

In one embodiment, a for loop of block 1002 performs blocks 1004-1016 for each latch or flip-flop in a circuit model. In block 1004, a phase expression C is determined. C can be determined as a phase expression on a clock input in ROLCMP form. However, use of other forms is contemplated.

A for loop of block 1006 performs blocks 1008-1014 for a number of condition-MIPE pairs in the C phase expression, where i indicates each pair element in C. At block 1008, M is set to a product (logical AND, or conjunction) of the mode of element i of C and of a mode constraint(s). The one or more mode constraints can be associated with the circuit being checked.

At block 1010, a determination is made whether M is not equal to zero, and whether the phase expression element i in C is equal to "< >" or to "–". If the determination is true, block 1012 is performed. Else, block 1014 is performed. In block 1012, an error is reported for the current latch or flip-flop. The error can indicate an "unclassified latch" under the condition M.

At block 1014, it is determined whether there is an additional condition-MIPE pair in the C phase expression. If there is an additional pair, blocks 1004-1012 are performed again, and counter i can be incremented. If there are no additional pairs, block 1016 is performed.

At block 1016, it is determined whether there is an additional flip-flop or latch in the design. If there is an additional flip-flop or latch, blocks 1002-1014 are performed again by processing the additional flip-flop or latch in the design. If there is no additional flip-flop or latch in the design, the method of FIG. 10 ends.

Figure 11:
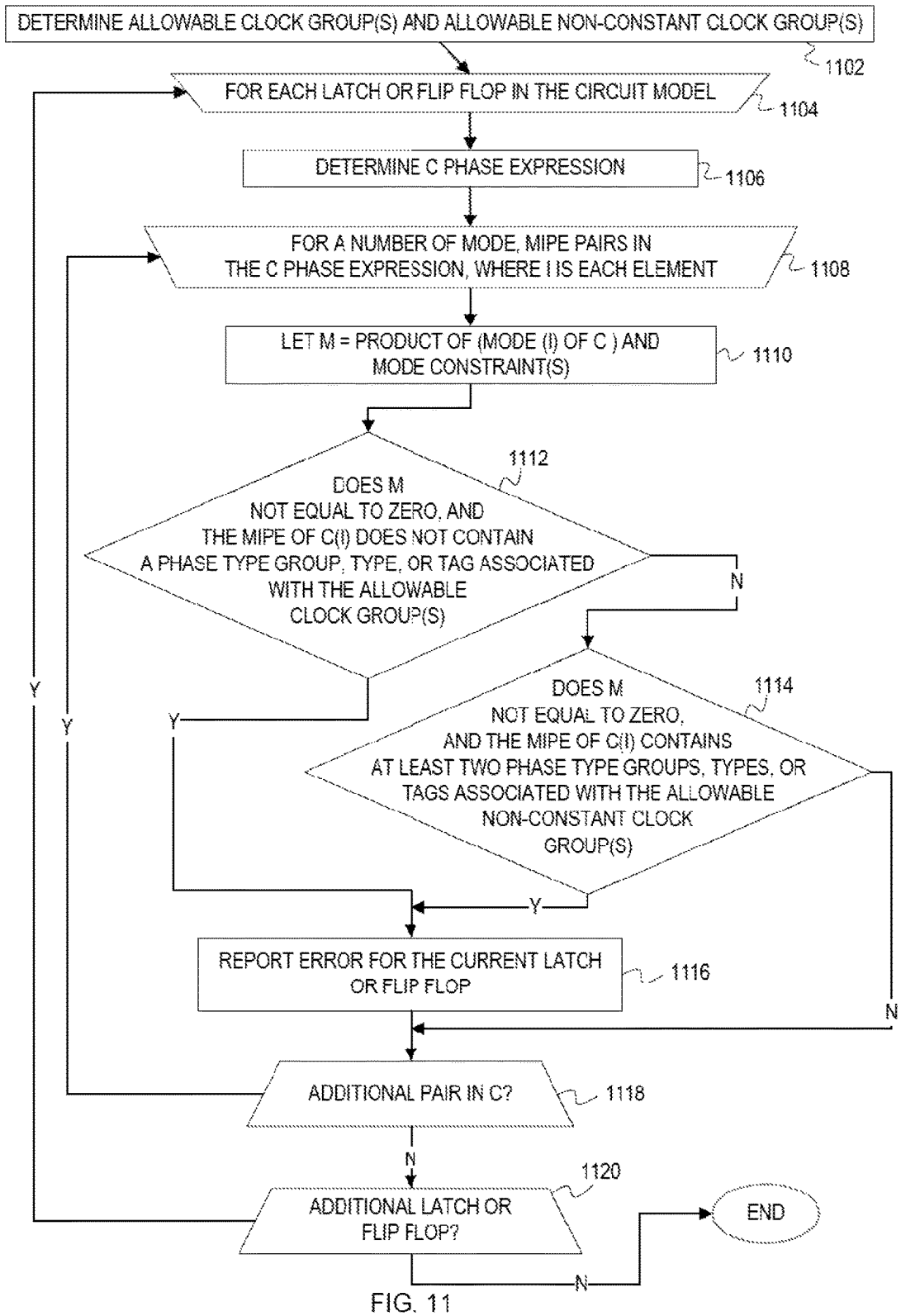

The method of FIG. 11 determines whether each transparent latch or flip-flop of a design is clocked by an allowable clock signal. In one embodiment, an algorithm implementing the method of FIG. 11 can define a variable called legal_clock_groups to include the phase type groups G0, G1, GCE, GCL, GCT, GGE, GGL, and GGT, such as described in the U.S. Patent Application Ser. No. 61/912,345, entitled "DETECTION OF CLOCK DOMAIN CROSSINGS AND POTENTIAL DEFECTS IN A CIRCUIT DESIGN AT THE REGISTER TRANSFER LEVEL." The algorithm can define a variable designated legal_nonconst_clock_groups to include the phase type groups GCE, GCL, GCT, GGE, GGL, and GGT. The algorithm can iterate through each transparent latch or flip-flop in the design. For each transparent latch or flip-flop in the design, the algorithm can assign the phase expression in ROLCMP form associated with the clock input of a transparent latch or flip-flop to a variable designated in the algorithm as C. The algorithm can iterate through each condition-MIPE pair (m_i, c_i) stored in variable C. For each condition-MIPE pair (m_i, c_i), the algorithm can determine the value of applying the AND mode operator to each mode expression m_i and each mode constraint, designated mode_constraint, storing the result in a variable designated M. The algorithm can check whether M does not equal 0 and whether MIPE c_i in C contains no phase tag with a phase type from the variable designated legal_clock_groups.

If the foregoing condition is met, then the algorithm can report an unallowable clock error (also referred to as an illegal clock error) for the particular latch or flip-flop being analyzed. Otherwise, the algorithm can check whether the following condition is met: M does not equal 0 and MIPE c_i in C contains at least two different phase tags with phase types in the variable legal_nonconst_clock_groups. If the foregoing condition is met, then the algorithm can report an illegal clock error for the particular latch or flip-flop under analysis in M. The algorithm can repeat until each transparent latch or flip-flop in the design has been analyzed.

In one embodiment, at block 1102, one or more allowable clock phase type group(s) and allowable non-constant clock phase type group(s) are determined. An example of allowable clock phase type group(s) and allowable non-constant clock phase type group(s) is described above. A for loop of block 1104 performs blocks 1106-1120 for each latch or flip-flop in the design. At block 1106, a phase expression C is determined. C can be determined as a phase expression on a clock input in ROLCMP form. However, use of other forms is contemplated.

A for loop of block 1108 performs blocks 1110-1118 for a number of condition-MIPE pairs in the C phase expression, where i indicates each pair element in C. At block 1110, M is set to a product (logical AND, or conjunction) of the mode of element i of C and of a mode constraint(s). The one or more mode constraints can be associated with the circuit being checked.

At block 1112, a determination is made whether M does not equal zero, and whether the MIPE for the ith element of C does not contain a phase type group, type, or tag that is associated with the allowable clock group(s). For example, the determination can include whether the MIPE of the ith element of C contains no phase tag with a phase type belonging to any phase type group from the allowable clock phase type group(s). If the determination is true, block 1116 is performed. Else, block 1114 is performed.

At block 1114, a determination is made whether M does not equal zero, and whether the MIPE for the ith element of C contains at least two phase type groups, types, or tags that are associated with the allowable non-constant clock group(s). For example, the determination can include whether the MIPE of the ith element of C contains at least two different phase tags with phase types belonging to phase type groups from the allowable non-constant clock phase type group(s), thus implying two different concurrent clocks. If the determination is true, block 1116 is performed. Else, block 1118 is performed.

In block 1116, an error is reported for the current latch or flip-flop. The error can indicate an "illegal clock" under the condition M.

At block 1118, it is determined whether there is an additional condition-MIPE pair in the C phase expression. If there is an additional pair, blocks 1108-1118 are performed again, and counter i can be incremented. If there are no additional pairs, block 1120 is performed.

At block 1120, it is determined whether there is an additional flip-flop or latch in the design. If there is an additional flip-flop or latch, blocks 1108-1120 are performed again by processing the additional flip-flop or latch in the design. If there is no additional flip-flop or latch in the design, the method of FIG. 11 ends.

Figure 12:
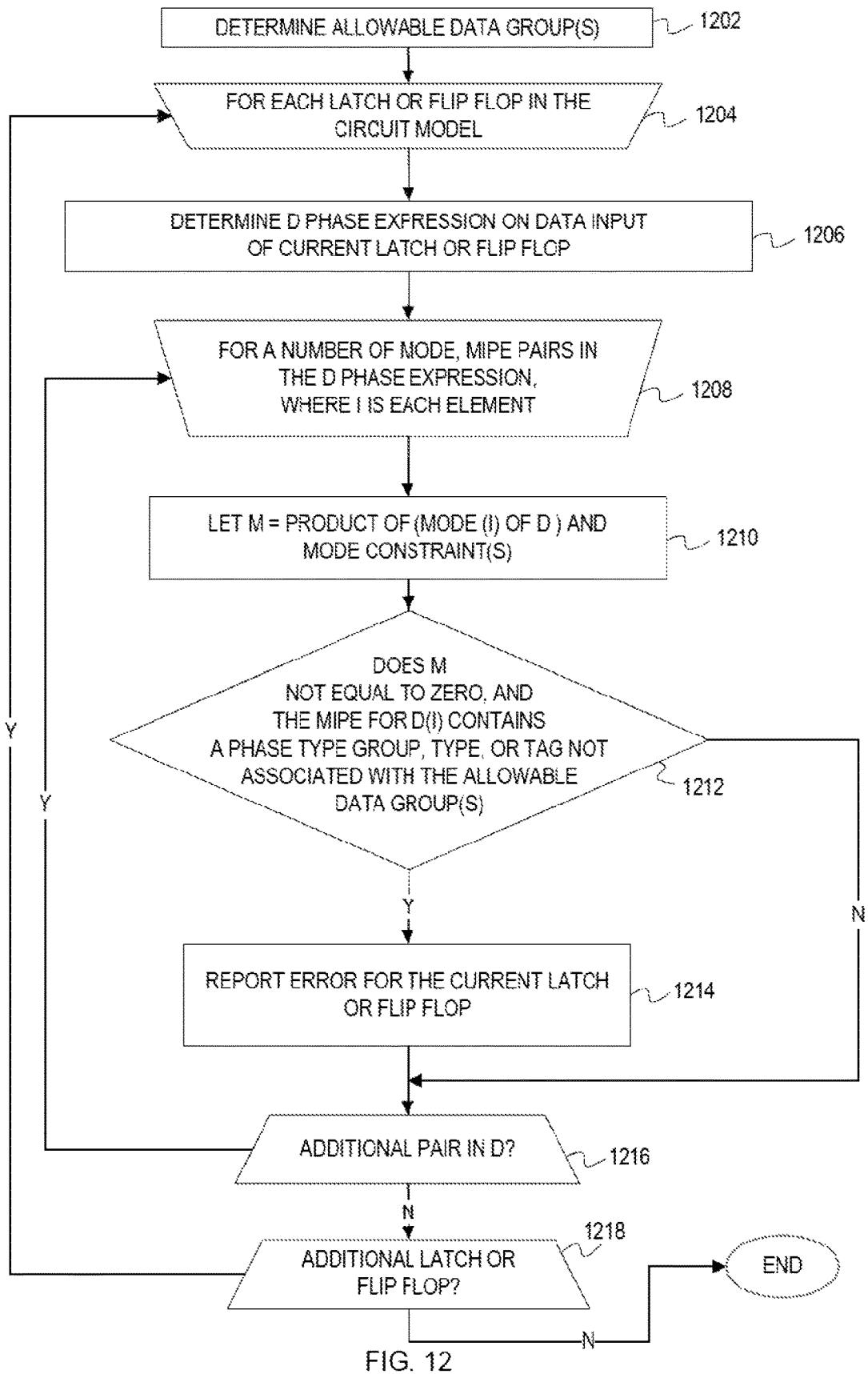

The method of FIG. 12 determines whether the data input of each transparent latch or flip-flop is connected to a data signal. In one embodiment, an algorithm implementing the method of FIG. 12 can define allowable phase type groups (also referred to as legal phase type groups) to be phase type groups that include G0, G1, GLE, GLL, GLT, GN, and GS, storing these phase type groups in a variable legal_data_groups. The algorithm can iterate through each transparent latch or flip-flop of the design. For each transparent latch or flip-flop of the design, the algorithm can assign the phase expression in ROLCMP form at each data input of a transparent latch or flip-flop to a variable D. For each MIPE pair (m_i, d_i) in D, the algorithm can determine the result of applying the AND mode operator to each mode expression m_i and mode constraint, denoted mode_constraint, storing the result in a variable M. The algorithm can determine whether the following condition is met: M does not equal 0 and the MIPE d_i contains a phase tag with a phase type that is not a member of any phase type group in the variable legal_data_groups. If the foregoing condition is met, then the algorithm can report an illegal data error for the latch or flip-flop in M. The algorithm can repeat until each transparent latch or flip-flop in the design has been analyzed.

In one embodiment, at block 1202, one or more allowable data groups are determined. An example of allowable data group(s) is described above. A for loop of block 1204 performs blocks 1206-1218 for each latch or flip-flop in the design. At block 1206, a phase expression D is determined. D can be determined as a phase expression on a data input in ROLCMP form. However, use of other forms is contemplated.

A for loop of block 1208 performs blocks 1210-1216 for a number of condition-MIPE pairs in the D phase expression, where i indicates each pair element in D. At block 1210, M is set to a product (logical AND, or conjunction) of the mode expression of element i of D and of a mode constraint(s). The one or more mode constraints can be associated with the circuit being checked.

At block 1212, a determination is made whether M does not equal zero, and whether the MIPE for the ith element of D contains a phase type group, type, or tag that is not associated with the allowable data group(s). For example, the determination can include whether the MIPE of the ith element of D contains a phase tag with a phase type that is not a member of any phase type group in the allowable data group(s). If the determination is true, block 1214 is performed. Else, block 1216 is performed.

In block 1214, an error is reported for the current latch or flip-flop. The error can indicate an "illegal data" under the condition M. At block 1216, it is determined whether there is an additional condition-MIPE pair in the D phase expression. If there is an additional pair, blocks 1208-1216 are performed again, and counter i can be incremented. If there are no additional pairs, block 1218 is performed.

At block 1218, it is determined whether there is an additional flip-flop or latch in the design. If there is an additional flip-flop or latch, blocks 1204-1218 are performed again by processing the additional flip-flop or latch in the design. If there is no additional flip-flop or latch in the design, the method of FIG. 12 ends.

Figure 13:
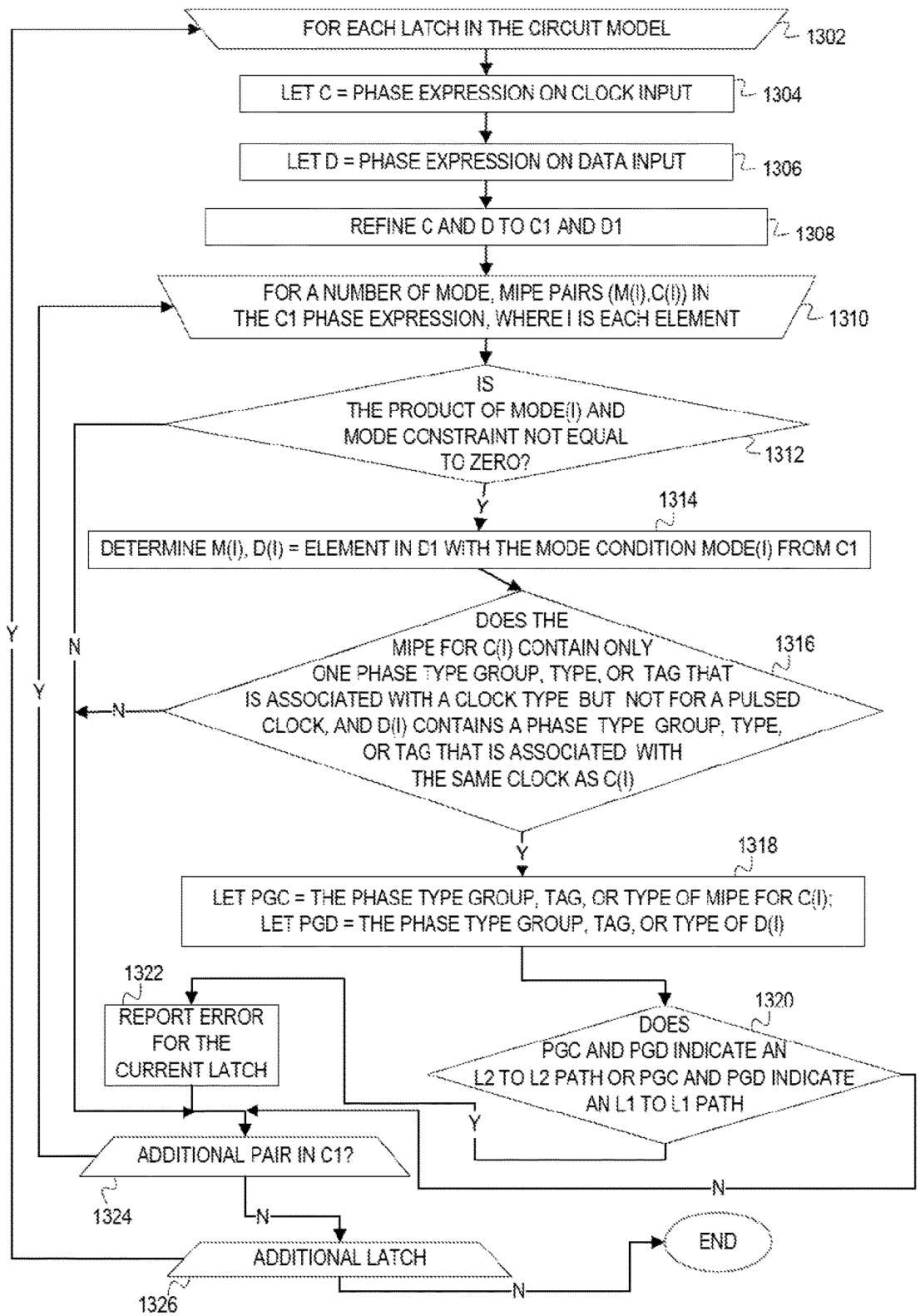

The method of FIG. 13 determines whether L1 and L2 ("L1/L2") transparent latches are used properly. It is assumed that L1/L2 latches are used properly if there are no L1-to-L1 or L2-to-L2 paths. An L1/L2 transparent latch configuration is also known as a "master/slave" latch configuration.

In one embodiment, an algorithm implementing the method of FIG. 13 iterates through each transparent latch in the design. For each transparent latch in the design, the algorithm can convert a phase expression at the clock input of the transparent latch to ROLCMP form, assigning the ROLCMP result to a variable C. The algorithm can convert the phase expression at the data input of the transparent latch to ROLCMP form, storing the result in a variable D. The algorithm can convert the variable pair (C, D) to a coarsest common refinement (such as the one described above with reference to FIG. 8), assigning the result of the transformation to the coarsest common refinement to the variable pair (C1, D1).

The algorithm can iterate through each pair (m_i, c_i) of C1. For each (m_i, c_i) in C1, the algorithm can determine whether the logical AND of the mode expression m_i and the mode constraint, designated mode_constraint does not equal 0. If the foregoing evaluates to true, then the algorithm selects the pair (m_i, d_i) in D1 with mode condition m_i. The algorithm can determine whether the following condition is met: MIPE c_i contains only one phase tag, denoted pt_c_i with a clock type phase type, the phase type of pt_c_i is not for a pulsed clock, and MIPE d_i contains a phase tag pt_d_i referencing the same virtual clock as pt_c_i. If the foregoing condition is met, then the algorithm can store the phase type group associated with the phase type of phase tag pt_c_i in a variable designated pgc.

The algorithm can store the phase type group associated with the phase type of phase tag pt_d_i in variable pgd. The algorithm can evaluate whether the following condition is met: pgc belongs to the set {GCL, GGL} and pgd belongs to the set {GLL, GLE}, indicating an illegal L2-to-L2 path, or pgc belongs to the set {GCT, GGT} and pgd belongs to the set {GLT, GLE}, indicating an illegal L1-to-L1 path. If either of the foregoing is met, then the algorithm can report an illegal data phase error for the transparent latch under the mode condition m_i AND mode_constraint. The algorithm can continue to iterate through each transparent latch of the design, repeating the described steps until each transparent latch has been analyzed.

In one embodiment, a for loop of block 1302 performs blocks 1304-1326 for each latch in a design. At block 1304, a phase expression C is determined. C can be determined as a phase expression on a clock input in ROLCMP form. However, use of other forms is contemplated. At block 1306, a phase expression D is determined. D can be determined as a phase expression on a data input in ROLCMP form. However, use of other forms is contemplated.

At block 1308, the pair (C, D) is refined to generate the pair (C1, D1), such as by applying the method of FIG. 8 to the pair (C, D). In other words, the coarsest common refinement method of FIG. 8 is applied to the pair (C, D).

A for loop of block 1310 performs blocks 1312-1324 for a number of condition-MIPE pairs in the C1 phase expression, where i indicates each pair element in C1. In other words, the for loop of block 1310 is performed for each (m_i, c_i)) pair in C1. At block 1312, a determination is made whether a product (logical AND, or conjunction) of the mode expression of element i of C1 and of a mode constraint(s) is not equal to zero. The one or more mode constraints can be associated with the circuit being checked. If the determination is true, block 1314 is performed. Else, block 1324 is performed.

At block 1314, the pair (m_i, d_i) is determined to be the element of D1 with the mode condition of the mode expression (i) from C1. At block 1316, a determination is made whether the MIPE for the ith element of C contains only one phase type group, type, or tag (referred to as pt_c_i) that is associated with a clock-type phase type and it is not for a pulsed clock. The determination of block 1316 also additionally determines whether the element of D1 having mode expression m_i has a MIPE containing a phase type group, type, or tag (referred to as pt_d_i) that references the same virtual clock as pt_c_i. If the determination is true, block 1318 is performed. Else, block 1324 is performed. At block 1318, a variable (referenced as PGC as an example) is set to the phase type group, type, or tag of pt_c_i). Another variable (referenced as PGD as an example) is set to the phase type group, type, or tag of pt_d_i).

At block 1320, a determination is made whether the variables PGC and PGD indicate an L2 to L2 path, or whether the variables PGC and PGD indicate an L1 to L1 path. The L2 to L2 and L1 to L1 are illegal latch paths, as discussed above. For example, at block 1320, the determination of an illegal L1 to L1 path can include determining whether PGC includes phase tag group GCL or GGL, and also that PGD includes phase tag group GLL or GLE. The determination of an illegal L2 to L2 path can include determining whether PGC includes phase tag group GCT or GGT, and also that PGD includes phase tag group GLT or GLE. If the determination is true, block 1322 is performed. Else, block 1324 is performed. In block 1322, an error is reported for the current latch. The error can indicate an "illegal data phase" under the mode condition m_i and the mode constraint(s).

At block 1324, it is determined whether there is an additional condition-MIPE pair in the C1 phase expression. If there is an additional pair, blocks 1310-1324 are performed again, and counter i can be incremented. If there are no additional pairs, block 1326 is performed. At block 1326, it is determined whether there is an additional latch in the design. If there is an additional latch, blocks 1302-1326 are performed again by processing the additional latch in the design. If there is no additional latch in the design, the method of FIG. 13 ends.

Figure 14:
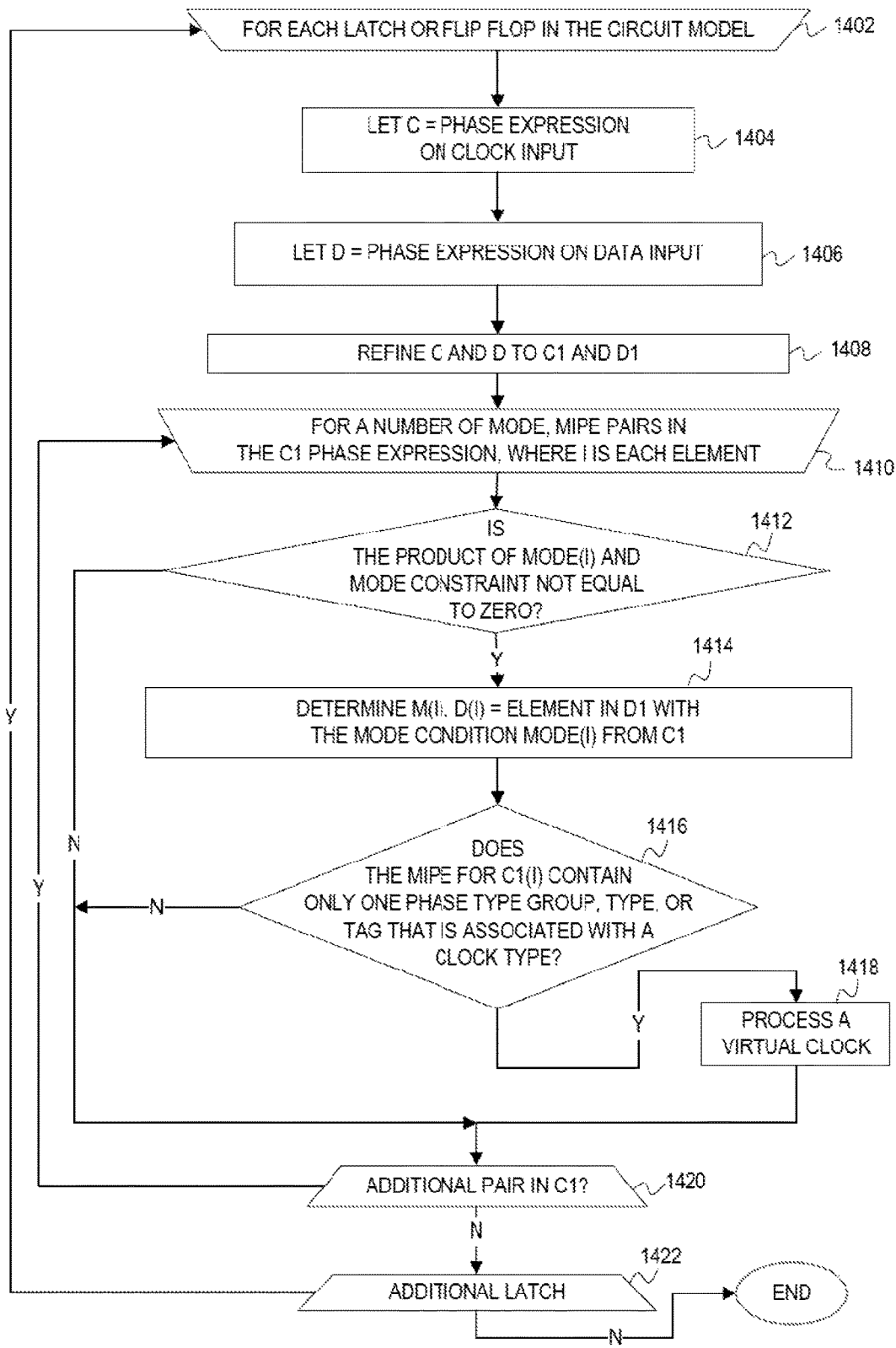
Figure 15:
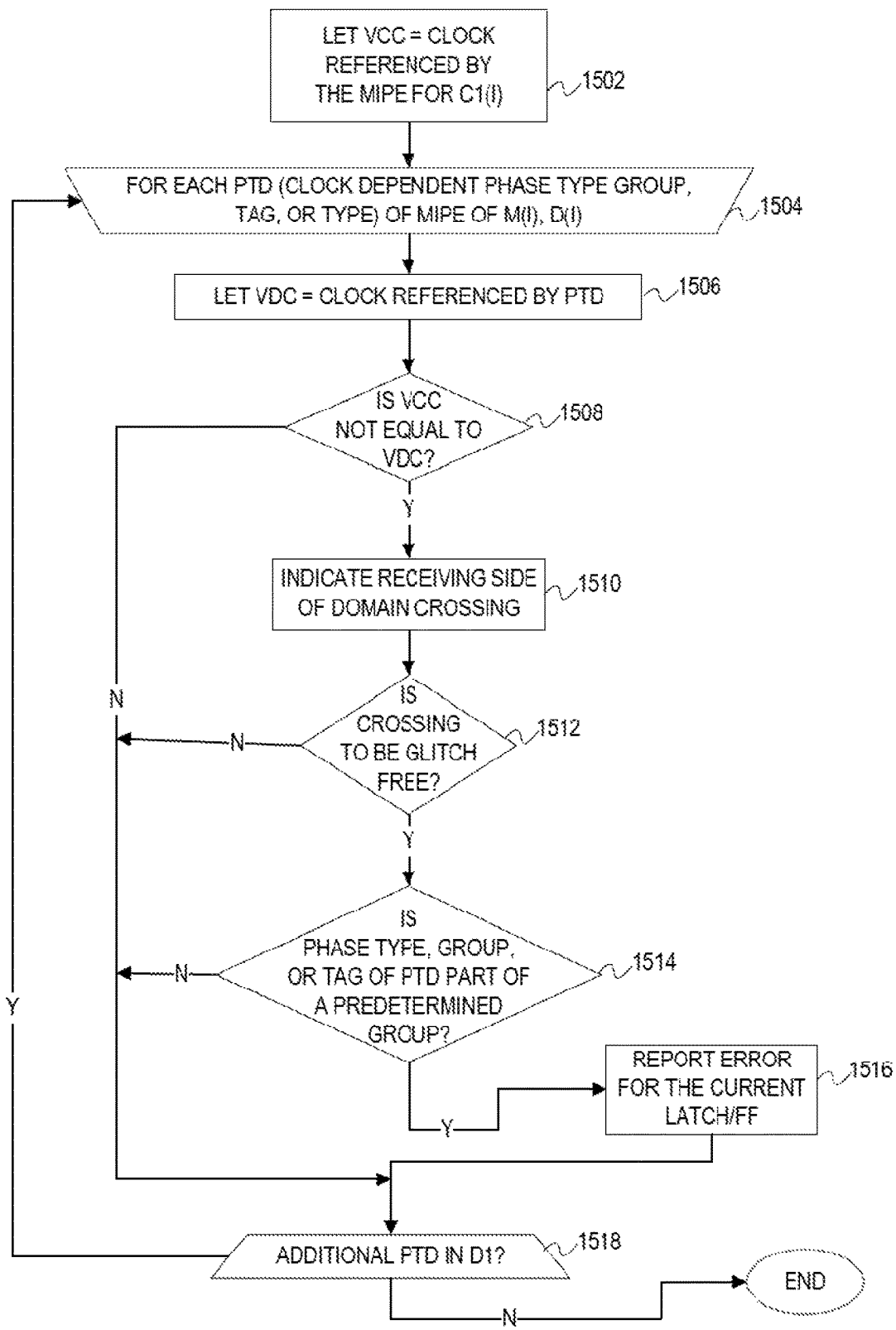

The method of FIGS. 14 and 15 can identify a transparent latch or flip-flop that receives a data signal generated by a circuit component using a different clock domain from that transparent latch or flip-flop. The method of FIGS. 14 and 15 can also identify any glitch-prone clock domain crossings in the design. In one embodiment, an algorithm implementing the method of FIGS. 14 and 15 can iterate through each transparent latch or flip-flop in a design. The algorithm can convert the phase expression at the clock input of the transparent latch or flip-flop to ROLCMP form, storing the result in a variable designated C. The algorithm can convert the phase expression at the data input of the transparent latch or flip-flop to ROLCMP form, storing the result in a variable designed D.

The algorithm can find the coarsest common refinement of the ROLCMP variables C and D (such as by using the method of FIG. 8), storing the result in variables C1 and D1. An OLCMP pair can include the variables (C1, D1). The algorithm can iterate through each element (m_i, c_i) of C1. For each element (m_i, c_i) of C1, the algorithm can check whether the logical AND of each mode constraint and the mode condition m_i does not equal 0. If the foregoing condition is true, then the algorithm can select an element (m_i, d_i) from D1 with mode condition m_i. The algorithm can check the element c_i of C1 to determine whether such MIPE element c_i contains exactly one phase tag, denoted pt_c_i, with a clock type phase type. If the foregoing condition is true, then the algorithm can assign the virtual clock referenced by phase tag pt_c_i to a variable vcc.

The algorithm can iterate through each clock dependent phase tag pt_d_i in MIPE d_i. For each clock dependent phase tag pt_d_i in MIPE d_i, the algorithm can assign the virtual clock referenced by phase tag pt di to a variable vcd. The algorithm can check whether variable vcd does not equal vcc. If vcd does not equal vcc, then the algorithm can include an instruction to mark the transparent latch or flip-flop as the receiving side of a clock domain crossing from vcd to vcc under mode condition m_i and the mode constraint designated by the variable mode_constraints. Having identified a clock domain crossing, the algorithm can check whether the clock domain crossing is glitch free, if the clock domain crossing has been designated as a crossing that should be glitch free. Thus, the algorithm can check whether the phase type associated with the phase tag pt_d_i is one of the phase types associated with glitch prone signals. If the phase type associated with the phase tag pt di is glitch prone, the algorithm can report an error under mode condition m_i and mode constraint mode_constraints.

In one embodiment, a for loop of block 1402 performs blocks 1404-1422 for each flip-flop or latch in a design. At block 1404, a phase expression C is determined. C can be determined as a phase expression on a clock input in ROLCMP form. However, use of other forms is contemplated. At block 1406, a phase expression D is determined. D can be determined as a phase expression on a data input in ROLCMP form. However, use of other forms is contemplated.

At block 1408, the pair (C, D) are refined to generate the pair (C1, D1), such as by applying the method of FIG. 8 to the pair (C, D). In other words, the coarsest common refinement method of FIG. 8 is applied to the pair (C, D).

A for loop of block 1410 performs blocks 1412-1420 for a number of condition-MIPE pairs in the C1 phase expression, where i indicates each pair element in C1. In other words, the for loop of block 1410 is performed for each (m_i, c_i) pair in C1. At block 1412, a determination is made whether a product (logical AND, or conjunction) of the mode expression of element i of C1 and of a mode constraint(s) is not equal to zero. The one or more mode constraints can be associated with the circuit being checked. If the determination is true, block 1414 is performed. Else, block 1420 is performed.

At block 1414, the pair (m_i, d_i) is determined to be the element of D1 with the mode condition of mode expression (i) of C1. At block 1416, a determination is made whether the MIPE for the ith element of C1 contains only one phase type group, type, or tag (referred to as pt_c_i) that is associated with a clock-type phase type. If the determination is true, block 1418 is performed. Else, block 1420 is performed. At block 1418, a virtual clock is processed, such as discussed below with reference to FIG. 15.

At block 1420, it is determined whether there is an additional condition-MIPE pair in the C1 phase expression. If there is an additional pair, blocks 1410-1420 are performed again, and counter i can be incremented. If there are no additional pairs, block 1422 is performed. At block 1422, it is determined whether there is an additional latch or flip-flop in the design. If there is an additional latch or flip-flop, blocks 1402-1422 are performed again by processing the additional latch in the design. If there is no additional latch in the design, the method of FIG. 14 ends.

In one embodiment, the method of FIG. 15 implements block 1418 of the method of FIG. 14. In one embodiment, at block 1502, a variable VCC is set to a clock that is referenced by the phase type group, type, or tag designated as pt_c_i above. A for loop of block 1504 performs blocks 1506-1518 for each phase type group, tag, or type (referred to as PTD) of the MIPE d_i. At block 1506, a variable VDC is set to a clock that is referenced by PTD.

At block 1508, a determination is made whether VCC is not equal to VDC. If the determination is true, block 1510 is performed. Else, block 1518 is performed. At block 1510, a receiving side of a domain crossing is indicated. For example, the latch or flip-flop being processed by the method of FIG. 15 can be marked as the receiving side of a clock domain crossing from VCC to VDC under mode condition m_i and the mode constraint(s).

At block 1512, a determination is made whether the domain crossing should be glitch free. For example, the domain crossing can be indicated to be glitch free prior to the performance of the method of FIG. 15. If the determination is true, block 1514 is performed. Else, block 1518 is performed.

At block 1514, a determination is made whether the phase type, group, or tag of PTD is part of a predetermined group. The predetermined group can include, for example, the phase types C@L, C@LP, C@T, C@TP, and C@E. However, other predetermined phase types, groups, or tags are contemplated. If the determination is true, block 1516 is performed. Else, block 1518 is performed. In block 1516, an error is reported for the current latch or flip-flop. The error can indicate an "error for glitch-prone clock domain crossing" under the mode condition m_i and the mode constraint(s). At block 1518, it is determined whether there is an additional PTD in D1. For example, at block 1518 it can be determined whether there is another clock-dependent PTD in the MIPE for the ith element of D1. If there is an additional PTD, blocks 1506-1518 are performed again. If there is no additional PTD, the method of FIG. 15 ends.

Figure 16:
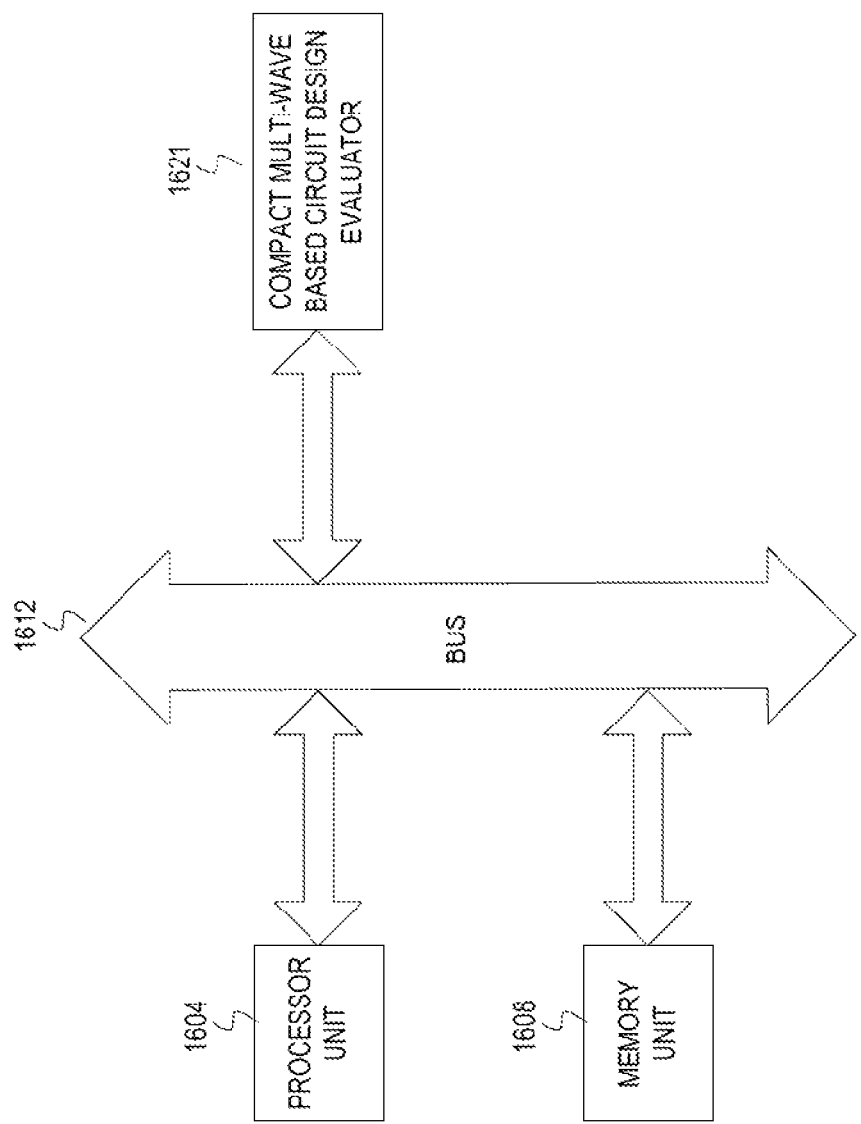
FIG. 16 depicts an example computer system compact multi-wave based circuit design evaluator.

FIG. 16 depicts an example computer system compact multi-wave based circuit design evaluator. A computer system includes a processor unit 1604 (possibly including multiple processors, multiple cores, multiple nodes, and/or implementing multi-threading, etc.). The computer system includes a memory unit 1608. The memory unit 1608 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1612 (e.g., PCI bus, ISA bus, PCI-Express bus, HyperTransport® bus, InfiniBand® bus, NuBus, etc.). The computer system also includes a compact multi-wave based circuit design evaluator ("evaluator") 1621. The evaluator propagates compact representations of multiple waveforms throughout nets of a register level circuit design representation as previously described. The memory unit 1608 may include one or more functionalities that facilitate storing the look-up tables or other data structures for evaluating a circuit design representation based on representations of multiple waveforms and decomposition of compact multi-waveform representations into sequence of nondeterministic signal transition representations. Any one of these functionalities may be partially (or entirely) implemented in hardware and/or on the processor unit 1604. For example, the functionality may be implemented with an application specific integrated circuit, in logic implemented in the processor unit 1604, in a co-processor on a peripheral device or card, etc. The processor unit 1604 and the memory unit 1608 are coupled to the bus 1612. Although illustrated as being coupled to the bus 1612, the memory unit 1608 may be coupled to the processor unit 1604.

While the embodiments are described with reference to various implementations and exploitations, it will be understood that these embodiments are illustrative and that the scope of the inventive subject matter is not limited to them. In general, techniques for evaluating a register level circuit design representation with compact multi-waveform representations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for evaluating a circuit design, the computer program product comprising:
   a non-transitory computer readable storage medium having program instructions including a compact multi-wave based circuit design evaluator stored thereon, the program instructions, when executed by one or more processors, cause the one or more processors to perform operations for evaluating the circuit design, the program instructions comprising program instructions to
   receive, by the one or more processors and the compact multiwave based circuit design evaluator, a register transfer level circuit design;
   determine, by the one or more processors and the compact multiwave based circuit design evaluator, two or more input sequences of signal transition representations associated with a first input net of an indicated component in the register transfer level circuit design, wherein the two or more input sequences of signal transition representations are associated with a mode element, each signal transition representation represents a nondeterministic transition from a previous signal state to a set of one or more possible signal states, and the mode element indicates a selection between two or more output sequences of signal transition representations; and determine, by the one or more processors and the compact multiwave based circuit design evaluator and based on the indicated component and on the mode element, the two or more output sequences of signal transition representations derived from the two or more input sequences of signal transition representations.

2. The computer program product of claim 1, wherein the two or more output sequences of signal transition representations comprise a first output sequence of signal transition representations and a second output sequence of signal transition representations, the mode element indicates the selection between the first output sequence of signal transition representations and the second output sequence of signal transition representations.

3. The computer program product of claim 1, further comprising program instructions to, determine a selection signal associated with the mode element, wherein the selection is based on a value of the selection signal.

4. The computer program product of claim 1, further comprising program instructions to, determine a type of the mode element, wherein the selection is determined based on the type of the mode element, wherein the type of the mode element indicates a logical function performed on values of two or more selection signals associated with the mode element.

5. The computer program product of claim 1, further comprising program instructions to, refine a pair of the two or more input sequences of signal transition representations, wherein a first of the pair of the two or more input sequences of signal transition representations is associated with the first input net, and a second of the pair of the two or more input sequences of signal transition representations is associated with a second input net of the indicated component, and the program instructions to refine the pair of the two or more input sequences comprise program instructions to generate a refined pair of input sequences of signal transition representations that comprises a first of the refined pair of input sequences of signal transition representations associated with the first input net and a second of the refined pair of input sequences of signal transition representations associated with the second input net.

6. The computer program product of claim 5, further comprising program instructions to, determine whether a first clock associated with the first of the refined pair of signal transition representations is different from a second clock associated with the second of the refined pair of signal transition representations; and indicate an occurrence of a clock domain crossing associated with the indicated component if the first clock is different from the second clock.

7. An apparatus comprising:
one or more processors; and
a non-transitory computer readable storage medium having stored thereon program instructions including a compact multiwave based circuit design evaluator, the program instructions executable by the one or more processors to cause the apparatus to perform operations for evaluating a circuit design, the program instructions to:

determine, via the one or more processors, two or more input sequences of signal transition representations associated with a first input net of an indicated component in a register transfer level circuit design, wherein the two or more input sequences of signal transition representations are associated with a mode element, each signal transition representation represents a nondeterministic transition from a previous signal state to a set of one or more signal states, and the mode element indicates a selection between two or more output sequences of signal transition representations; and determine, based on the indicated component and on the mode element, the two or more output sequences of signal transition representations derived from the two or more input sequences of signal transition representations.

8. The apparatus of claim 7, wherein the two or more output sequences of signal transition representations comprise a first output sequence of signal transition representations and a second output sequence of signal transition representations, the mode element indicates the selection between the first output sequence of signal transition representations and the second output sequence of signal transition representations.

9. The apparatus of claim 7, further comprising program instructions executable by the one or more processors to, determine a selection signal associated with the mode element, wherein the selection is based on a value of the selection signal.

10. The apparatus of claim 7, further comprising program instructions executable by the one or more processors to, determine a type of the mode element, wherein the selection is determined based on the type of the mode element, wherein the type of the mode element indicates a logical function performed on values of two or more selection signals associated with the mode element.

11. The apparatus of claim 7, further comprising program instructions executable by the one or more processors to, refine a pair of the two or more input sequences of signal transition representations, wherein a first of the pair of the two or more input sequences of signal transition representations is associated with the first input net, and a second of the pair of the two or more input sequences of signal transition representations is associated with a second input net of the indicated component, and the program instructions to refine the pair of the two or more input sequences comprise program instructions to generate a refined pair of input sequences of signal transition representations that comprises a first of the refined pair of input sequences of signal transition representations associated with the first input net and a second of the refined pair of input sequences of signal transition representations associated with the second input net.

12. The apparatus of claim 11, further comprising program instructions executable by the one or more processors to, determine whether a first clock associated with the first of the refined pair of signal transition representations is different from a second clock associated with the second of the refined pair of signal transition representations; and indicate occurrence of a clock domain crossing associated with the indicated component if the first clock is different from the second clock.

* * * * *